(12) United States Patent
Okada et al.

(10) Patent No.: US 11,323,767 B2
(45) Date of Patent: May 3, 2022

(54) DEMODULATION DEVICE, PROCESSING DEVICE, RECEPTION DEVICE, AND DATA PROCESSING METHOD

(71) Applicant: SONY SEMICONDUCTOR SOLUTIONS CORPORATION, Atsugi (JP)

(72) Inventors: Satoshi Okada, Tokyo (JP); Yuichi Hirayama, Chiba (JP); Kazuyuki Takahashi, Chiba (JP)

(73) Assignee: SONY SEMICONDUCTOR SOLUTIONS CORPORATION, Atsugi (JP)

( * ) Notice: Subject to any disclaimer, the term of this patent is extended or adjusted under 35 U.S.C. 154(b) by 171 days.

(21) Appl. No.: 16/618,922

(22) PCT Filed: May 31, 2018

(86) PCT No.: PCT/JP2018/020902
§ 371 (c)(1),
(2) Date: Dec. 3, 2019

(87) PCT Pub. No.: WO2018/230348
PCT Pub. Date: Dec. 20, 2018

(65) Prior Publication Data
US 2020/0145715 A1    May 7, 2020

(30) Foreign Application Priority Data

Jun. 14, 2017  (JP) .............................. JP2017-117054
Jul. 24, 2017  (JP) .............................. JP2017-142986

(51) Int. Cl.
*H04N 21/438*   (2011.01)
*H04N 21/43*    (2011.01)
(Continued)

(52) U.S. Cl.
CPC ....... *H04N 21/438* (2013.01); *H04N 21/4302* (2013.01); *H04N 21/64322* (2013.01); *H04N 21/854* (2013.01)

(58) Field of Classification Search
CPC ............. H04N 21/438; H04N 21/4302; H04N 21/64322; H04N 21/854
See application file for complete search history.

(56) References Cited

U.S. PATENT DOCUMENTS

2002/0122424 A1 *  9/2002  Kawarai ................. H04L 49/90
                                                      370/394
2017/0118317 A1   4/2017  Hasegawa et al.

FOREIGN PATENT DOCUMENTS

EP      0546795 A1 *  6/1993  ............ H03M 5/145
JP      2015-156636 A    8/2015
(Continued)

OTHER PUBLICATIONS

International Search Report dated Aug. 7, 2018 in PCT/JP2018/020902, 2 pages.

*Primary Examiner* — Chenea Davis
(74) *Attorney, Agent, or Firm* — Oblon, McClelland, Maier & Neustadt, L.L.P.

(57) ABSTRACT

The present technology relates to a demodulation device, a processing device, a reception device, and a data processing method for more flexibly coping with change in transmission method.

Provided is a demodulation device including a demodulation unit configured to demodulate a first transmission packet obtained from a broadcast signal, and an output unit configured to output a divided packet via a predetermined interface, the divided packet being obtained by dividing the first transmission packet that is a variable-length packet used in a first transmission method into a packet length according to a second transmission packet that is a fixed-length packet (Continued)

used in a second transmission method and arranging the first transmission packet in a payload, and adding a header including information for restoring the first transmission packet to the payload. The present technology can be applied to, for example, a demodulation IC incorporated in a television receiver or a set top box.

48 Claims, 25 Drawing Sheets

(51) Int. Cl.
  *H04N 21/643* (2011.01)
  *H04N 21/854* (2011.01)

(56) References Cited

FOREIGN PATENT DOCUMENTS

| | | |
|---|---|---|
| JP | 2016-208161 A | 12/2016 |
| WO | WO 2015/198545 A1 | 12/2015 |
| WO | WO 2017/065020 A1 | 4/2017 |
| WO | WO 2017/065021 A1 | 4/2017 |

* cited by examiner

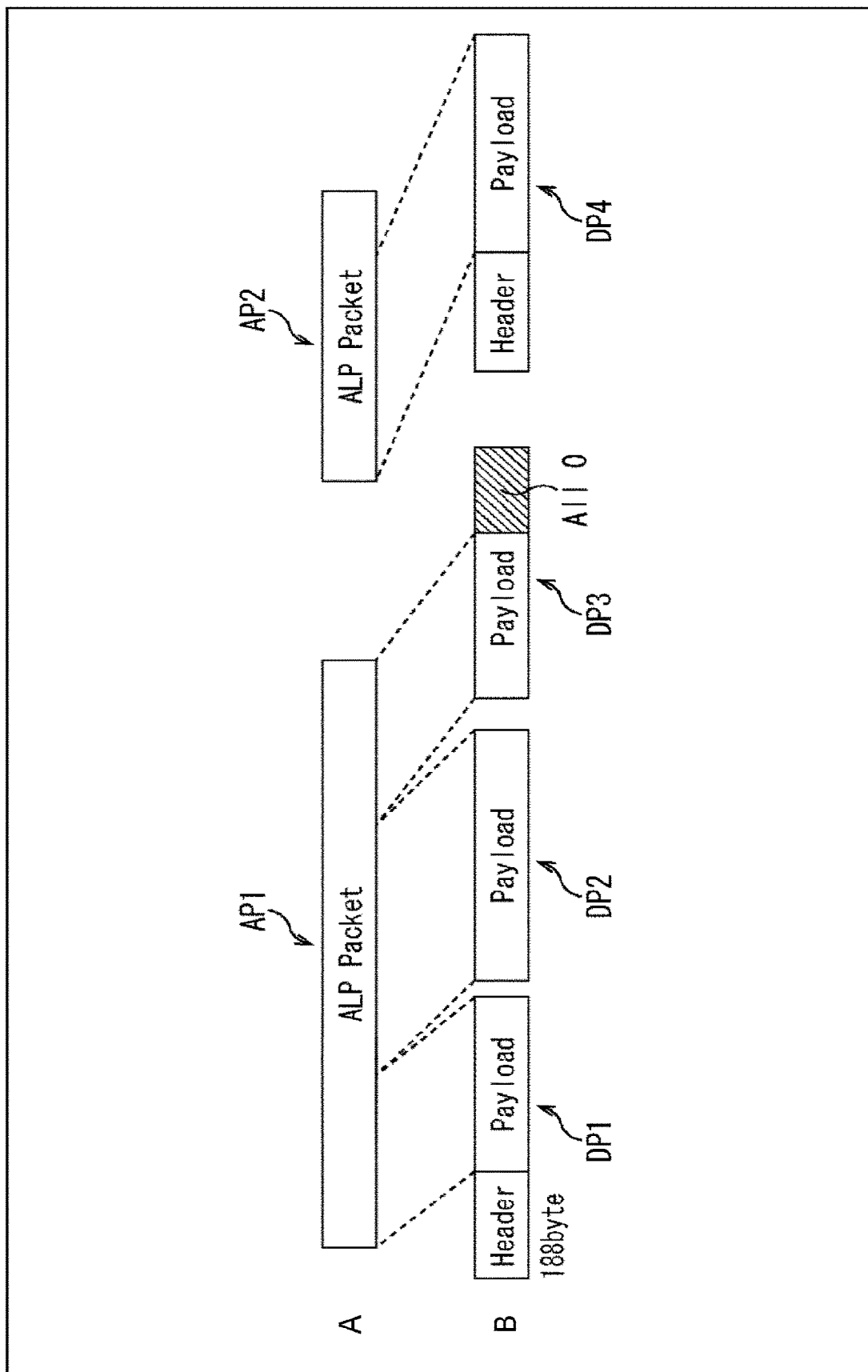

FIG. 17

| No | HEADER INFORMATION | | FIRST DIVISION MODE (SIMPLE DIVISION) | SECOND DIVISION MODE (DIVISION+ZERO PADDING) | THIRD DIVISION MODE (DIVISION+ZERO PADDING+HEADER REDUCTION) |
|---|---|---|---|---|---|
| 1 | SYNCHRONIZATION BYTE | Sync | ○ | ○ | ○ |
| 2 | ERROR INDICATOR | Error Indicator | ○ | ○ | ○ |
| 3 | PTP PRESENCE/ABSENCE FLAG | PTP Indicator | ○ | ○ (1:Payload=PTP) | ○ (1 Payload=PTP) |
| 4 | ALP PACKET HEAD PRESENCE/ABSENCE FLAG | ALP Packet Start Indicator | ○ | ○ (1: HEAD OF ALP PACKET) | ○ (Header=HEAD OF ALP PACKET) |
| 5 | PLP_ID SWITCHING FLAG | PLP Indicator | ○ *3 | × (ALWAYS HEAD OF Payload) | × (ALWAYS HEAD OF Payload) |
| 6 | PTP | PTP | ○ *1 | ○ *1 | ○ *1 |
| 7 | HEAD POINTER | Start Pointer | ○ | × (ALWAYS HEAD OF Payload) | × (ALWAYS HEAD OF Payload) |
| 8 | PLP_ID SWITCHING HEAD POINTER | PLP_ID_Pointer | ○ *3 | × (ALWAYS HEAD OF Payload) | × (ALWAYS HEAD OF Payload) |
| 9-1 | PACKET ID (FIXED ID) | PID | ○ | ○ | ○ |
| 9-2 | PACKET ID (PLP_ID) | PID | ○ *3 | ○ *2 | ○ *2 |

* 1: TRANSMISSION OF PTP WITH ALP PACKET IS UNNECESSARY.
* 2: TRANSMISSION OF PLP_ID WITH ALP PACKET IS UNNECESSARY.
* 3: INFORMATION CANNOT BE USED IN A CASE WHERE PLP_ID CHANGES TWICE IN 188 bytes.

FIG. 23

| Syntax | No. of Bits | Semantics |
|---|---|---|
| adaptation_field() { | | |
| adaptation_field_length | 8 | LENGTH OF ADAPTATION FIELD |
| if(adaptation_field_length)>0) { | | |
| discontinuity_indicator | 1 | INDICATING THAT ALP PACKET IS DISCONTINUOUS |
| random_access_indicator | 1 | INDICATING RANDOM ACCESS POINT |
| ALP_packet_priority_indicator | 1 | INDICATING THAT PRIORITY OF ALP PACKET IS HIGHER THAN OTHER ALP PACKETS |
| PTP_flag | 1 | INDICATING THAT PTP IS INCLUDED |
| PLP_ID_flag | 1 | INDICATING THAT PLP_ID IS INCLUDED |
| reserved | 3 | FUTURE RESERVATION |
| if(PTP_flag=='1') { | | |
| L1B_time_info_flag | 2 | REPRESENTING PRECISION OF PTP (TIME INFORMATION) (01: MILLISECOND, 10: MICROSECOND, 11: NANOSECOND) |
| L1D_time_sec | 32 | PTP (TIME INFORMATION): SECONDS |
| L1D_time_msec | 10 | PTP (TIME INFORMATION): MILLISECONDS |
| L1D_time_usec | 10 | PTP (TIME INFORMATION): MICROSECONDS |
| L1D_time_nsec | 10 | PTP (TIME INFORMATION): NANOSECONDS |
| } | | |
| if(PLP_ID_flag=='1') { | | |
| PLP_ID | 6 | PLP_ID |
| reserved | 2 | FUTURE RESERVATION |
| } | | |
| } | | |
| } | | |

DEMODULATION DEVICE, PROCESSING DEVICE, RECEPTION DEVICE, AND DATA PROCESSING METHOD

TECHNICAL FIELD

The present technology relates to a demodulation device, a processing device, a reception device, and a data processing method, and more particularly to a demodulation device, a processing device, a reception device, and data processing for more flexibly coping with change in transmission method.

BACKGROUND ART

At present, the MPEG2-transport stream (TS) method is widely used as a transmission method for digital broadcasting, but from now on, spread of the IP transmission method using internet protocol (IP) packets for digital broadcasting, which are used in the field of communication, is assumed.

For example, Advanced Television Systems Committee (ATSC) 3.0, which is one of the next-generation terrestrial broadcasting standards, is also expected to adopt an IP transmission method to provide more advanced services (for example, Patent Document 1). Furthermore, broadcasting methods other than ATSC 3.0 are also expected to adopt an IP transmission method in the future.

CITATION LIST

Patent Document

Patent Document 1: Japanese Patent Application Laid-Open No. 2016-208161

SUMMARY OF THE INVENTION

Problems to be Solved by the Invention

By the way, in the case where the MPEG2-TS method is introduced as an existing transmission method in the operation of digital broadcasting, introduction of an IP transmission method as a new transmission method is assumed. In that case, it is desirable to more flexibly cope with change in transmission method.

The present technology has been made in view of such a situation, and intends to more flexibly cope with change in transmission method.

Solutions to Problems

A demodulation device according to a first aspect of the present technology is a demodulation device including: a demodulation unit configured to demodulate a first transmission packet obtained from a broadcast signal; and an output unit configured to output a divided packet via a predetermined interface, the divided packet being obtained by dividing the first transmission packet that is a variable-length packet used in a first transmission method into a packet length according to a second transmission packet that is a fixed-length packet used in a second transmission method and arranging the first transmission packet in a payload, and adding a header including information for restoring the first transmission packet to the payload.

The demodulation device according to the first aspect of the present technology may be an independent device or may be internal blocks constituting one device. Furthermore, a data processing method according to the first aspect of the present technology is a data processing method corresponding to the above-described demodulation device according to the first aspect of the present technology.

In the demodulation device and the data processing method according to the first aspect of the present technology, the first transmission packet obtained from the broadcast signal is demodulated. Furthermore, the divided packet is output via a predetermined interface, the divided packet being obtained by dividing the first transmission packet that is a variable-length packet used in a first transmission method into a packet length according to a second transmission packet that is a fixed-length packet used in a second transmission method and arranging the first transmission packet in a payload, and adding a header including information for restoring the first transmission packet to the payload.

A processing device according to a second aspect of the present technology is a processing device including: a processing unit configured to process a first transmission packet restored from data arranged in a payload on the basis of information included in a header of a divided packet input via a predetermined interface, in which the first transmission packet is a variable-length packet used in a first transmission method and is obtained from a broadcast signal, and the divided packet is obtained by dividing the first transmission packet into a packet length according to a second transmission packet that is a fixed-length packet used in a second transmission method and arranging the first transmission packet in a payload, and adding a header including information for restoring the first transmission packet to the payload.

The processing device according to the second aspect of the present technology may be an independent device or may be internal blocks constituting one device. Furthermore, a data processing method according to the second aspect of the present technology is a data processing method corresponding to the above-described processing device according to the second aspect of the present technology.

In the processing device and data processing method according to the second aspect of the present technology, the first transmission packet restored from data arranged in a payload is processed on the basis of information included in a header of a divided packet input via a predetermined interface. Furthermore, the first transmission packet is a variable-length packet used in the first transmission method and obtained from the broadcast signal, and the divided packet is obtained by dividing the first transmission packet into a packet length according to a second transmission packet that is a fixed-length packet used in a second transmission method and arranging the first transmission packet in a payload, and adding a header including information for restoring the first transmission packet to the payload.

A reception device according to a third aspect of the present technology is a reception device including: a demodulation unit configured to demodulate a first transmission packet obtained from a broadcast signal; and a processing unit configured to process the first transmission packet demodulated by the demodulation unit, in which the demodulation unit and the processing unit are connected via a predetermined interface, the demodulation unit outputs a divided packet to the processing unit, the divided packet being obtained by dividing the first transmission packet that is a variable-length packet used in a first transmission method into a packet length according to a second transmission packet that is a fixed-length packet used in a second transmission method and arranging the first transmission packet in a payload, and adding a header including information for restoring the first transmission packet to the payload, and the processing unit processes the first transmission packet restored from data arranged in the payload on the basis of information included in the header of the divided packet input from the demodulation unit.

The reception device according to the third aspect of the present technology may be an independent device or may be an internal block constituting one device. Furthermore, a data processing method according to the third aspect of the present technology is a data processing method corresponding to the above-described reception device according to the third aspect of the present technology.

In the reception device and the data processing method according to the third aspect of the present technology, the demodulation unit for demodulating the first transmission packet obtained from the broadcast signal and the processing unit for processing the first transmission packet demodulated by the demodulation unit are connected via the predetermined interface. Furthermore, the demodulation unit side outputs the divided packet to the processing unit, the divided packet being obtained by dividing the first transmission packet that is a variable-length packet used in the first transmission method into a packet length according to a second transmission packet that is a fixed-length packet used in a second transmission method and arranging the first transmission packet in a payload, and adding a header including information for restoring the first transmission packet to the payload, and the processing unit side processes the first transmission packet restored from data arranged in the payload on the basis of information included in the header of the divided packet input from the demodulation unit.

Effects of the Invention

According to the first to third aspects of the present technology, it is possible to more flexibly cope with change in transmission method.

Note that effects described here are not necessarily limited, and any of effects described in the present disclosure may be exhibited.

BRIEF DESCRIPTION OF DRAWINGS

FIG. 16 is a diagram illustrating an example of a structure of a divided packet according to a sixth embodiment.

FIG. 17 is a diagram illustrating an example of combination of way of cutting the divided packet and header information according to the sixth embodiment.

FIG. 23 is a diagram illustrating an example of syntax of Adaptation_field( ).

MODE FOR CARRYING OUT THE INVENTION

Hereinafter, embodiments of the present technology will be described with reference to the drawings. Note that the description will be given in the following order.

1. Overview of the Present Technology
2. System Configuration
3. Embodiments of the Present Technology
    (1) First Embodiment: Basic Configuration
    (2) Second Embodiment: Configuration for Specifying Head Position of ALP Packet with Pointer and Packet Length
    (3) Third Embodiment: Configuration Including PLP_ID in ALP Packet
    (4) Fourth Embodiment: Configuration Including Time Information in ALP packet
    (5) Fifth Embodiment: Configuration in which Zero Padding is performed to Align Packet Boundaries
    (6) Sixth Embodiment: Configuration to Reduce Divided Header
    (7) Seventh Embodiment: Example of Combination of Header Information of Divided Header and Division Form
    (8) Eighth Embodiment: Configuration in a case where PLP_ID is Transmitted in Format Other Than ALP
    (9) Ninth Embodiment: Configuration Using Adaptation Field 4. Flow of Processing Executed on Reception Side
5. Modification
6. Configuration of Computer

1. OVERVIEW OF THE PRESENT TECHNOLOGY

At present, the MPEG2-TS method is widely used as a transmission method for digital broadcasting, but from now on, spread of IP transmission methods is expected. For example, ATSC 3.0, which is one of the next-generation terrestrial broadcast standards adopts an IP transmission method, and storing UDP/IP packets in ATSC link-layer protocol (ALP) packets and transmitting the packets is defined.

Note that, in the following description, the MPEG2-TS method is described as an example of existing transmission methods (existing methods), and the IP transmission method adopted in ATSC 3.0 will be described as an example of new transmission methods (new methods).

By the way, in a television receiver, a broadcast signal is demodulated by demodulation IC, and packets obtained as a result of the demodulation are processed by a system on chip (SoC) at a subsequent stage. In a case where a broadcast signal compatible with the IP transmission method that is a new method is received by the television receiver compatible with the MPEG2-TS method that is an existing method, a configuration as illustrated in FIG. 1 is assumed, for example.

Figure 1:
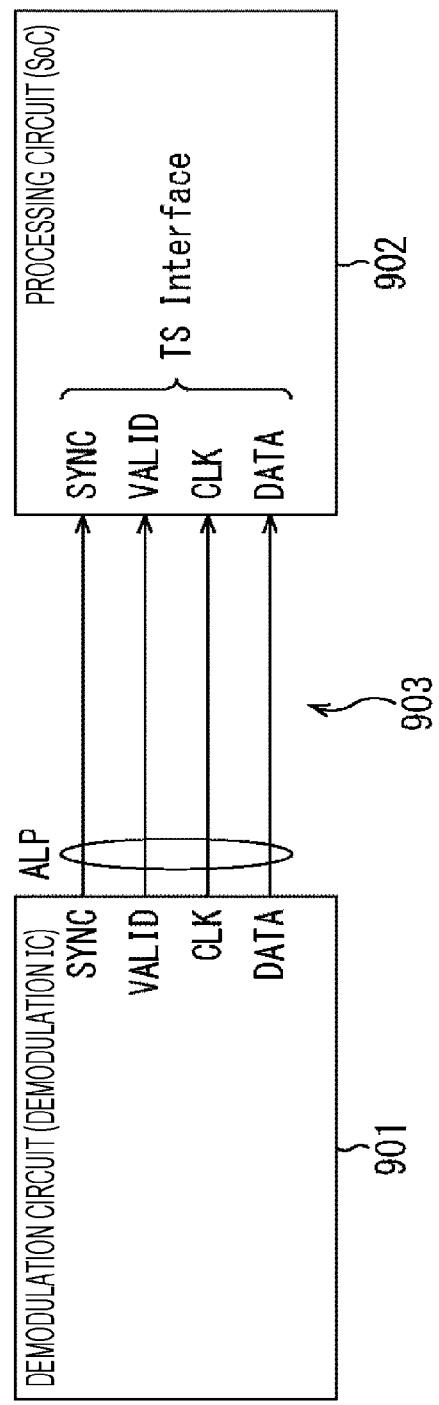
FIG. 1 is a block diagram illustrating a configuration of a demodulation IC on a reception side and a system on chip (SoC).

In other words, in FIG. 1, a demodulation circuit 901 is a demodulation IC compatible with ATSC 3.0, and is connected with a processing circuit 902 configured as a system on chip (SoC) via a physical interface 903 by the MPEG2-TS method. Here, the demodulation circuit 901 at a preceding stage is replaced with a demodulation circuit compatible with the new method. However, the processing circuit 902 at the subsequent stage is made compatible with the new method by using hardware (HW) by the existing method as it is and updating (rewriting) software (SW).

In this case, the physical interface 903 between the demodulation circuit 901 and the processing circuit 902 is compatible with the MPEG2-TS method, whereas the format of data to be transmitted is an ALP packet compatible with ATSC 3.0. A synchronization signal (SYNC), a valid signal (VALID), a clock signal (CLK), and data (DATA) are transmitted by the ALP packet.

Figure 2:
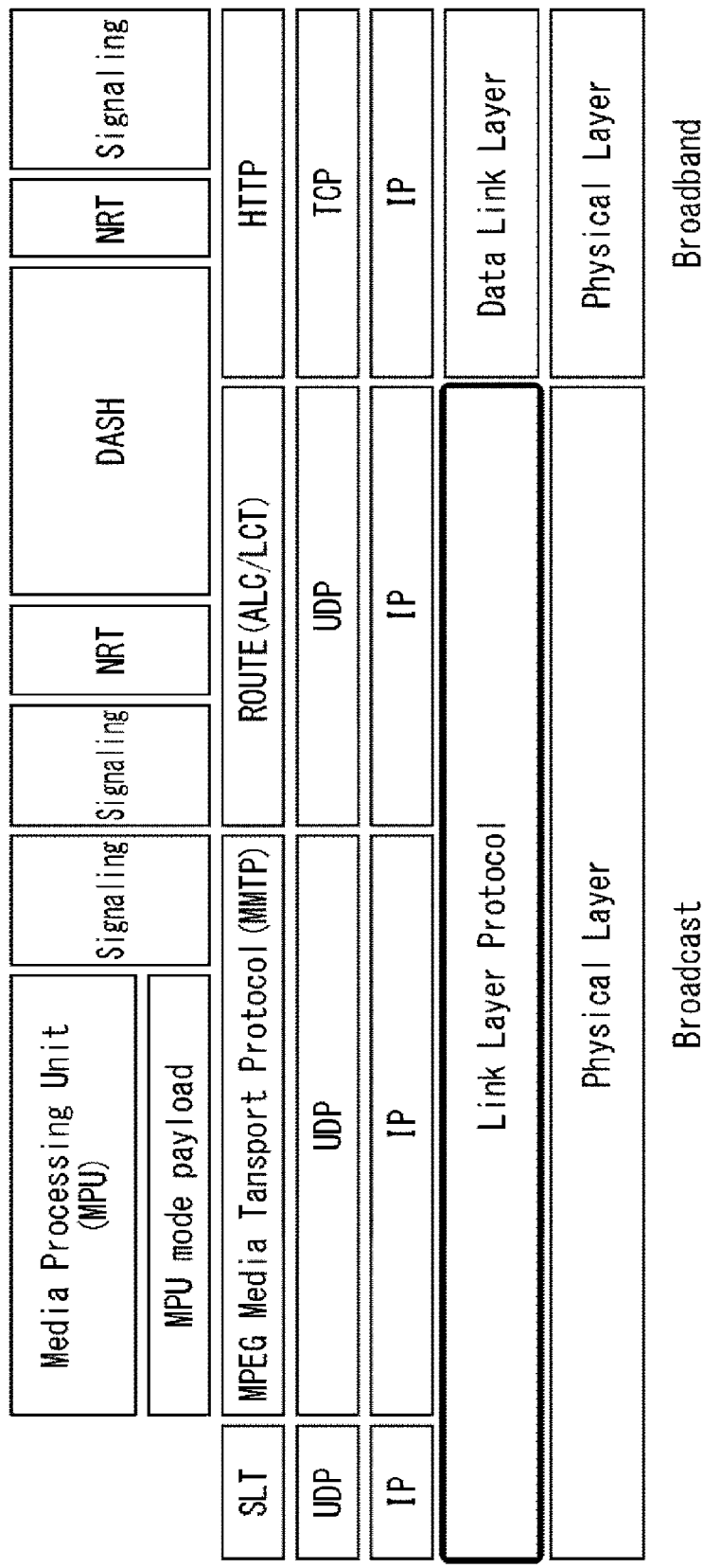
FIG. 2 is a diagram illustrating an example of a protocol stack of an IP transmission method.

Here, FIG. 2 illustrates an example of a protocol stack of the IP transmission method. As illustrated in FIG. 2, in the IP transmission method, streaming delivery conforming to dynamic adaptive streaming over HTTP (MPEG-DASH) can be performed by using a common IP protocol in unidirectional broadcasting and bidirectional communication, and transmitting a stream of content of a television program or the like in units of DASH segments, for example.

In FIG. 2, a layer that is an upper layer of a physical layer of broadcast and is a lower layer of an UDP layer and an IP layer is a data link layer. In this data link layer, an ALP packet compatible with a link layer protocol is used.

Figure 3:
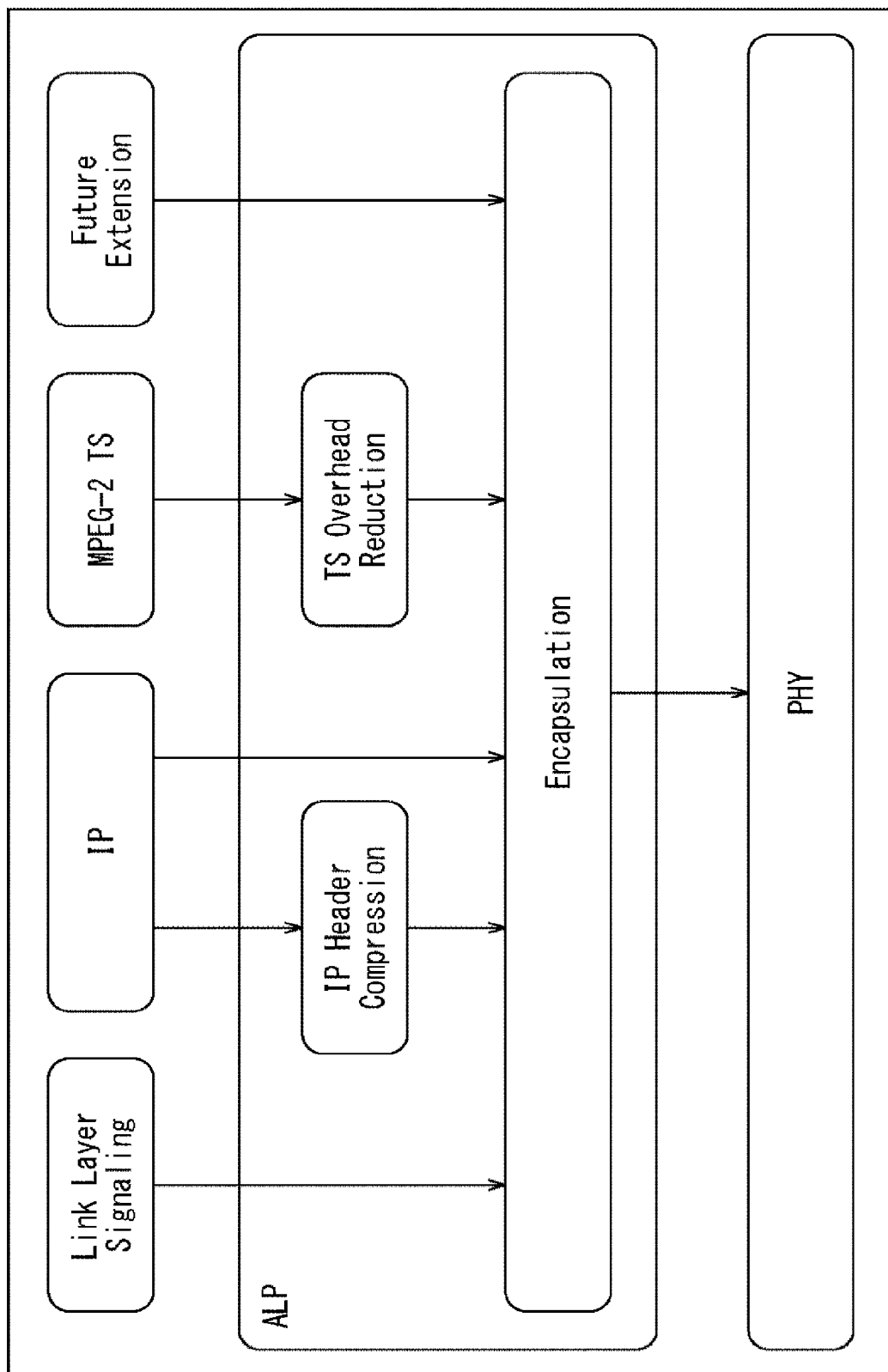
FIG. 3 is a diagram illustrating system architecture of an ALP packet.

Furthermore, FIG. 3 illustrates system architecture of the ALP packet. As illustrated in FIG. 3, the ALP packet is generated by encapsulating signaling (link layer signaling), a TS packet used in the MPEG2-TS method, and the like, in addition to an IP packet (UDP/IP packet). Note that, when encapsulating an IP packet, an IP header can be compressed. Furthermore, overhead can be reduced when encapsulating a TS packet.

Figure 4:
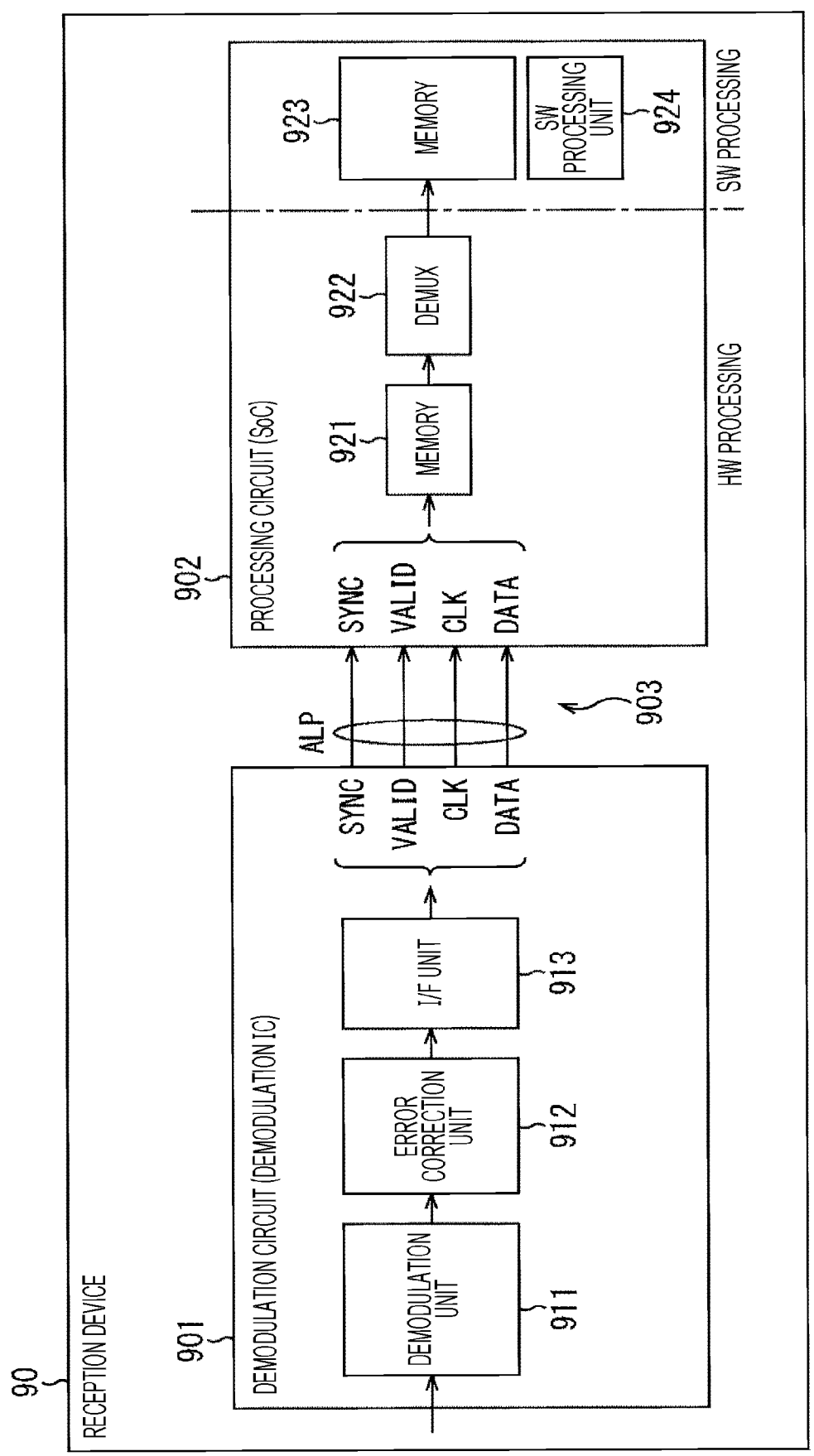
FIG. 4 is a block diagram illustrating a configuration of a reception device including a demodulation IC and a system on chip (SoC).

FIG. 4 is a block diagram illustrating a configuration of a reception device 90 including the demodulation circuit 901 and the processing circuit 902 illustrated in FIG. 1.

In FIG. 4, the reception device 90 includes the demodulation circuit 901 as a demodulation IC, and the processing circuit 902 as a system on chip (SoC). The demodulation circuit 901 includes a demodulation unit 911, an error correction unit 912, and an I/F unit 913. The processing circuit 902 includes a memory 921, a demux 922, a memory 923, and a SW processing unit 924.

Furthermore, in the reception device 90, the demodulation circuit 901 and the processing circuit 902 are connected via the predetermined physical interface 903. Thereby, the ALP packet output from the demodulation circuit 901 is input to the processing circuit 902 via the physical interface 903.

Here, in the processing circuit 902, the ALP packet from the demodulation circuit 901 is input, temporarily recorded in the memory 921, and processed by the demux 922 at the subsequent stage. Since the packet length of the ALP packet is different from the packet length of the TS packet, there is a possibility that the memory 921 is broken.

In other words, in the processing circuit 902, the processing by the demux 922 for data recorded in the memory 921 at the preceding stage is hardware processing (HW processing), whereas processing by the SW processing unit 924 for data recorded in the memory 923 at the subsequent stage is software processing (SW processing).

Then, for the part of the hardware processing, of the processing performed by the processing circuit 902, hardware compatible with the MPEG2-TS method as an existing method is used as it is, whereas for the part of the software processing, the software (SW) of the SW processing unit 924 is updated to be compatible with the IP transmission method (ATSC 3.0) as a new method. Therefore, the memory 921 and the demux 922 for performing the hardware processing are compatible with the MPEG2-TS method as an existing method, not with the IP transmission method (ATSC 3.0) as a new method.

The memory 921 is assumed to be written with the TS packet with a fixed length (188 bytes) corresponding to the MPEG2-TS method, but when the ALP packet is input from the demodulation circuit 901 to the processing circuit 902 and written in the memory 921, the memory 921 may be broken because the ALP packet is a variable-length packet and has a different packet length from the TS packet. Furthermore, since the demux 922 at the subsequent stage is assumed to process the TS packet, the demux 922 may not be able to process the ALP packet when the ALP packet is input.

To avoid the above situation, a technique of dividing the ALP packet input from the demodulation circuit 901 to the processing circuit 902 to adjust the packet length of the ALP packet to the packet length of the TS packet with 188 bytes is conceivable. However, in the case where the ALP packet is simply divided into 188 bytes on the demodulation circuit 901 side, and the divided packet is input to the processing circuit 902 side via the physical interface 903, the processing circuit 902 side may not be able to cope with the format of the divided packet.

Therefore, a proposal for more flexibly coping with the change in transmission method when the transmission method is switched from the MPEG2-TS method as an existing method to the IP transmission method as a new method (in particular, in a transition period from the existing method to the new method) is demanded.

Therefore, in the present technology, a divided packet is output to the processing circuit, the divided packet being obtained by dividing the ALP packet that is a variable-length packet used in the IP transmission method as a new method into the packet length according to the TS packet that is a fixed-length packet used in the MPEG2-TS method as an existing method and arranging the ALP packet in a payload on the demodulation circuit side as a demodulation IC, and adding a header including information (restoration information) for restoring the ALP packet to the payload.

Thereby, the divided packet from the demodulation circuit is input to the processing circuit side as a system on chip (SoC). This divided packet has the packet length according to the TS packet used in the MPEG2-TS method as an existing method. Therefore, even if the hardware processing is compatible with the MPEG2-TS method as an existing method (the hardware processing is not compatible with ATSC 3.0), the processing can be reliably performed. Meanwhile, since the software processing can be made compatible with the IP transmission method (ATSC 3.0) as a new method by the update of the software (SW), the ALP packet restored from data arranged in the payload on the basis of the restoration information included in the header of the divided packet can be processed.

By doing so, when the IP transmission method is introduced as a new method in the case where the MPEG2-TS method has been introduced as an existing method, it is possible to more flexibly cope with the change in transmission system.

2. SYSTEM CONFIGURATION (Configuration Example of Broadcast System)

Figure 5:
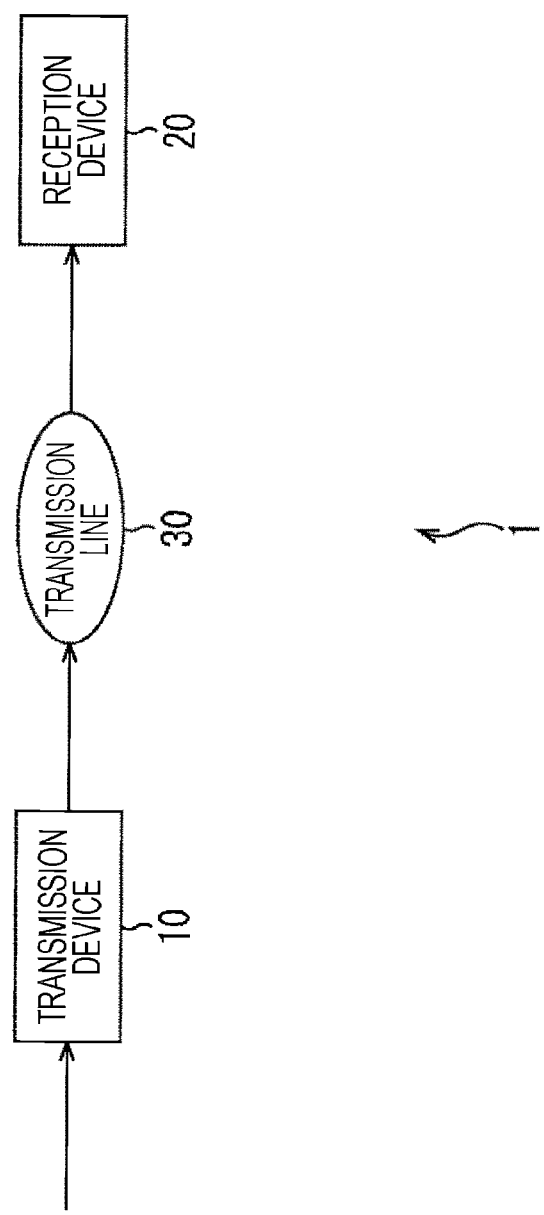
FIG. 5 is a block diagram illustrating a configuration example of a broadcast system to which the present technology is applied.

FIG. 5 is a block diagram illustrating a configuration example of a broadcast system to which the present technology is applied. Note that the term "system" means a group of a plurality of devices that is logically gathered.

In FIG. 5, a broadcast system 1 includes a transmission device 10 and a reception device 20. In this broadcast system 1, data transmission conforming to a predetermined broadcast method (for example, ATSC 3.0) is performed.

The transmission device 10 applies processing such as modulation and error correction to data of content (for example, a television program, or the like) input thereto, and transmits a broadcast signal obtained as a result of the processing via a transmission antenna of a transmission station, The broadcast signal from the transmission device 10 goes through a transmission line 30 and is received by the reception device 20 via a reception antenna installed at each home or the like of an end user. For example, the reception device 20 is configured as a fixed receiver such as a television receiver or a set top box (STB).

The reception device 20 applies processing such as demodulation and error correction to the broadcast signal received via the transmission line 30, and output video and audio data of content (for example, a television program, or the like) obtained as a result of the processing.

Note that, in the broadcast system 1, the transmission line 30 may be satellite broadcasting using a broadcasting satellite (BS) or a communications satellite (CS), wire broadcasting (common antenna television (CATV)) using a cable, or the like, for example, in addition to the terrestrial broadcasting.

(Configuration Example of Reception Device)

Figure 6:
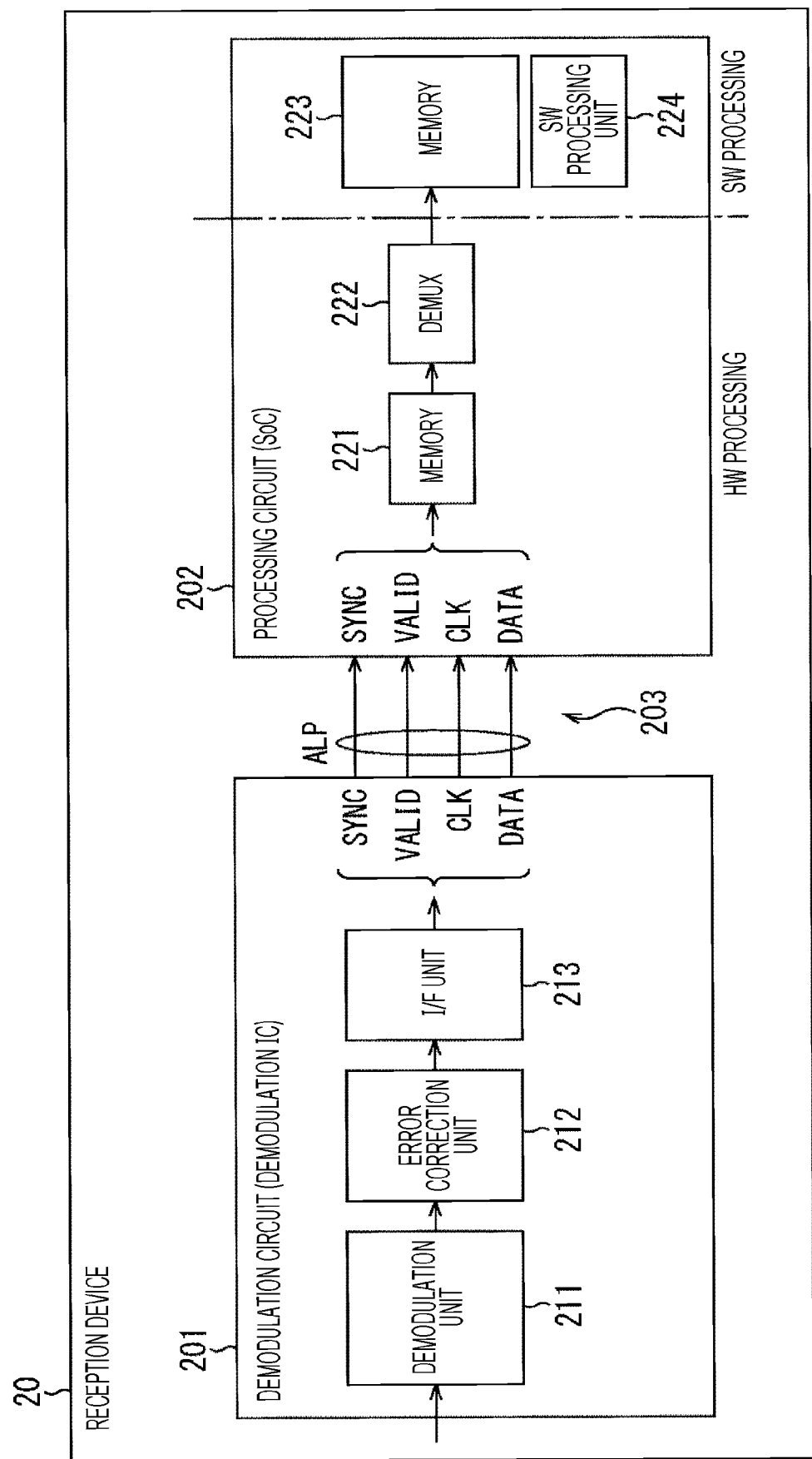
FIG. 6 is a block diagram illustrating a configuration example of the reception device in FIG. 5.

FIG. 6 is a block diagram illustrating a configuration example of the reception device 20 in FIG. 5.

In FIG. 6, the reception device 20 includes a demodulation circuit 201 and a processing circuit 202. In the reception device 20, the demodulation circuit 201 and the processing circuit 202 are connected via a predetermined physical interface 203.

The demodulation circuit 201 is configured as a demodulation device such as a demodulation IC. The demodulation circuit 201 demodulates the ALP packet obtained from the broadcast signal received via an antenna (not illustrated). Furthermore, the demodulation circuit 201 generates the divided packet from the ALP packet, and outputs the divided packet to the processing circuit 202 via the physical interface 203.

The demodulation circuit 201 includes a demodulation unit 211, an error correction unit 212, and an I/F unit 213.

The demodulation unit 211 performs demodulation processing for the broadcast signal received via the antenna, and supplies data obtained as a result of the processing to the error correction unit 212.

The error correction unit 212 performs error correction decoding processing for the data supplied from the demodulation unit 211, and supplies data obtained as a result of the processing to the I/F unit 213.

The I/F unit 213 performs predetermined data processing for the data supplied from the error correction unit 212, and outputs data obtained as a result of the processing to the processing circuit 202 via the physical interface 203.

Here, the I/F unit 213 generates the divided packet on the basis of the ALP packet obtained from the data from the error correction unit 212, and outputs the divided packet to the processing circuit 202 via the physical interface 203.

The divided packet is obtained by dividing the ALP packet (variable-length packet used in the IP transmission method as an existing method) into the packet length according to the TS packet (fixed-length packet used in the MPEG2-TS method as a new method) and arranging the ALP packet in a payload, and adding a header including restoration information to the payload.

Note that, as the restoration information of the header, a pointer (head pointer) indicating the position of a head of the ALP packet, information corresponding to a TS header of the TS packet, and the like can be included. Details will be described below.

The processing circuit 202 is configured as a system on chip (SoC). The processing circuit 202 restores the ALP packet from the divided packet input from the demodulation circuit 201 via the physical interface 203. The processing circuit 202 processes the restored ALP packet (ALP packet demodulated by the demodulation circuit 201).

The processing circuit 202 includes a memory 221, a demux 222, a memory 223, and a SW processing unit 224.

Note that, in the processing circuit 202, the processing by the demux 222 for the data recorded in the memory 221 at the preceding stage is hardware processing (HW processing), and the hardware compatible with the MPEG2-TS method as an existing method is used as it is. Meanwhile, the processing by the SW processing unit 224 for the data recorded in the memory 223 at the subsequent stage is software processing (SW processing), and the software (SW) of the SW processing unit 224 is updated to be compatible with the IP transmission method (ATSC 3.0) as a new method.

The divided packet input from the demodulation circuit 201 is written in the memory 221. The demux 222 processes the divided packet written in the memory 221, and writes data after the processing in the memory 223 at the subsequent stage. Here, since the divided packet is obtained by dividing the ALP packet into the packet length according to the TS packet, the processing can be reliably performed even if the hardware processing is one compatible with the MPEG2-TS method as an existing method (one not compatible with ATSC 3.0).

The SW processing unit 224 processes the data written in the memory 223. Here, since (the software processing of) the SW processing unit 224 can be made compatible with the IP transmission method (ATSC 3.0) as a new method by the update of the software (SW), the ALP packet restored from data arranged in the payload on the basis of the restoration information included in the header of the divided packet can be processed.

3. EMBODIMENTS OF THE PRESENT TECHNOLOGY

Here, first, technical content as the premise will be described with reference to FIGS. 7 to 9, and then embodiments of the present technology will be described with reference to FIGS. 10 to 13.

(Structure of TS Packet)

Figure 7:
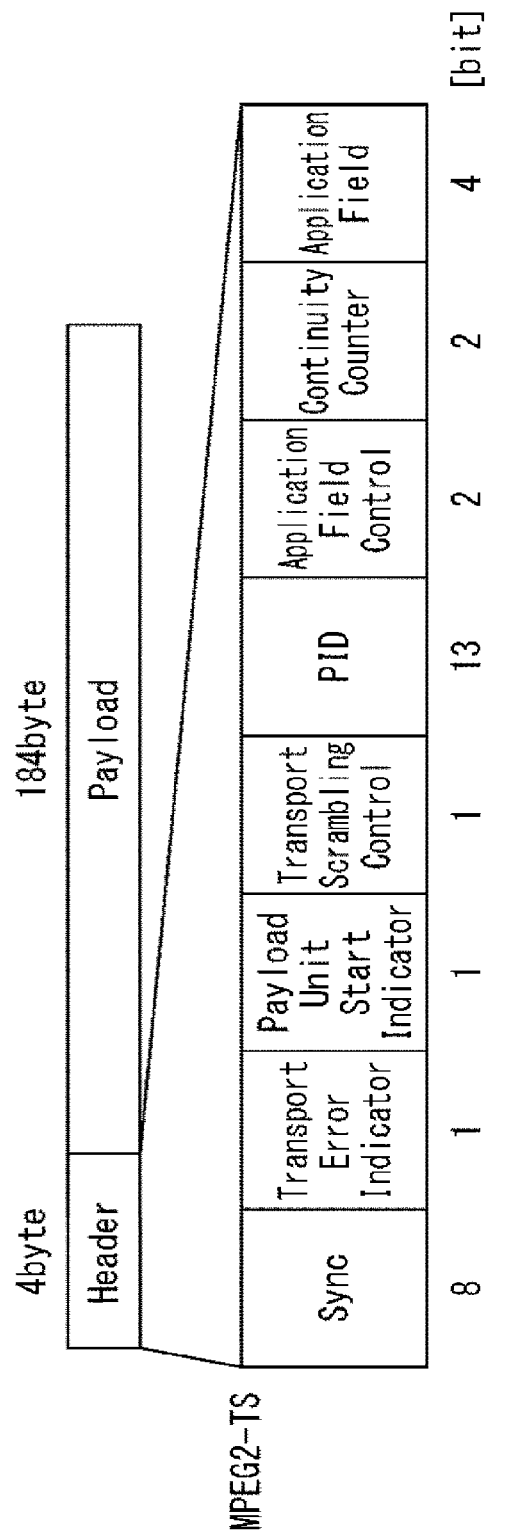
FIG. 7 is a diagram illustrating an example of a structure of a TS packet.

FIG. 7 is a diagram illustrating an example of a structure of the TS packet.

The TS packet includes a 4-byte header and a 184-byte payload.

In the 4-byte header, 8-bit Sync, 1-bit Transport Error Indicator, 1-bit Payload Unit Start Indicator, 1-bit Transport Scrambling Control, 13-bit PID, 2-bit Application Field Control, 2-bit Continuity Counter, and 4-bit Application Field is arranged.

Sync is a synchronization byte and is, for example, '0x47'.

Transport Error Indicator is a flag indicating the presence or absence of a bit error in the target TS packet. For example, in a case where Transport Error Indicator is '1', the indicator indicates that at least one uncorrectable error is present in the TS packet.

In a case where Payload Unit Start Indicator is '1', the indicator indicates that a start point of the payload of the target TS packet is a start point or a pointer of a PES packet.

Transport Scrambling Control is a region used for identifying a scrambling mode of the payload of the target TS packet. A scramble control value is predetermined.

PID is a region used for identifying a data type of the payload of the target TS packet.

Application Field Control is a flag indicating the presence or absence of Application Field or a payload in the target TS packet.

Continuity Counter is a continuity index used for confirming whether or not a packet is missing, and is incremented by one each time a packet with the same PID arrives.

Application Field is a region of an application.

(Structure of ALP Packet)

Figure 8:
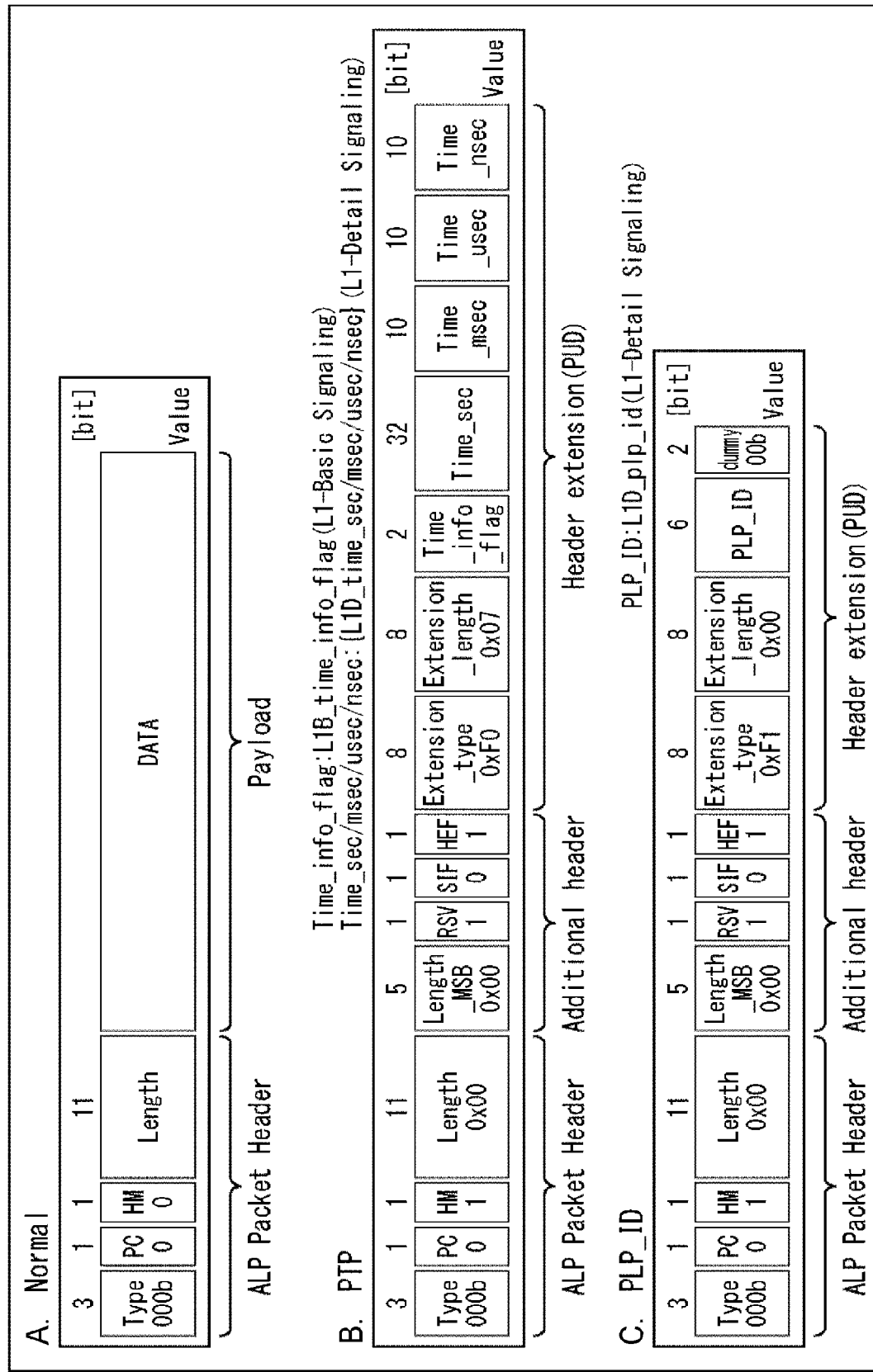
FIG. 8 is a diagram illustrating examples of structures of ALP packets.

FIG. 8 is a diagram illustrating examples of structures of the ALP packet.

(A) Normal

A in FIG. 8 is a diagram illustrating a structure of a normal ALP packet. In A in FIG. 8, the normal ALP packet includes an ALP header (ALP Packet Header) and a payload (Payload).

3-bit Type is set to a head of the ALP header. Information regarding the type of data arranged in the payload of the ALP packet is set to this Type.

In an ALP header, 1-bit Payload Configuration (PC) is arranged next to Type. In a case where '0' is set as PC, a single packet mode is set according to 1-bit Header Mode (HM) arranged next to PC, and 11-bit Length and ALP extension header (Additional header) is arranged in the ALP header.

In the case of the normal ALP packet, '0' is set as HM, and in the ALP header, 11-bit Length is arranged following HM. Furthermore, in the normal ALP packet, the payload is arranged following the ALP header.

(B) PTP

B in FIG. 8 is a diagram illustrating a structure of an ALP packet (hereinafter also referred to as an ALP packet with PTP) in a case where Precision Time Protocol (PTP) is added to the ALP extension header.

In the ALP packet with PTP, 3-bit Type, 1-bit PC, and 1-bit HM are arranged in the ALP header, and '1' is set as HM. In a case where "1" is set as HM, an ALP extension header (Additional header) is arranged following 11-bit Length.

This ALP extension header (Additional header) includes 5-bit Length_MSB, 1-bit reserved (RSV), 1-bit Sub-stream Identifier Flag (SIF), and 1-bit Header Extension Flag (HEF).

Length_MSB indicates a most significant bit (MSB) of a total payload length of the ALP packet in units of bytes, and is concatenated with a least significant bit (LSB) indicated by 11-bit Length of the ALP header to obtain the total payload length.

SIF is a flag indicating whether or not an optional header for substream is to be arranged. In a case where '0' is set as SIF, the setting means that the optional header is not arranged.

HEF is a flag indicating whether or not optional header extension is performed. In a case where '1' is set as HEF, header expansion is performed. In the ALP header of the ALP packet with PTP in B in FIG. 8, 8-byte header extension is performed for the ALP extension header.

In this header extension, 8-bit Extension type, 8-bit Extension_length, 2-bit Time_info_flag, 32-bit Time_sec, 10-bit Time_msec, 10-bit Time_usec, and 10-bit Time_nsec are arranged. In this example, since PTP (time information) specified by Time_sec, Time_msec, Time_usec, and Time_nsec is arranged as private user data (PUD) according to Time_info_flag, values of a type and a length corresponding to this arrangement are set to Extension_type and Extension_length, respectively.

Here, PTP is time information defined in IEEE 1588-2008. PTP includes a second field and a nanosecond field, and can cope with nanosecond precision. PTP is included in a preamble of a physical layer frame, indicates a time of a head of the physical layer frame, and is used as time information of clock recovery performed on the reception side, for example.

For example, in a case of Time_info_flag='01', the time information in seconds (Time_sec) and the time information in milliseconds (Time_msec) are arranged. Furthermore, for example, in a case of Time_info_flag='10', the time information in microseconds (Time_usec) is arranged in addition to the time information in seconds and milliseconds (Time_sec and Time_msec). Furthermore, for example, in a case of Time_info_flag='11', time information in nanoseconds (Time_nsec) is arranged in addition to the time information in seconds, milliseconds, and microseconds (Time_sec, Time_msec, and Time_usec).

Note that 2-bit L1B_time_info_flag defined in L1B signaling (L1-Basic Signaling) corresponds to Time_info_flag in ATSC 3.0, for example. Furthermore, 32-bit L1D_time_sec, 10-bit L1D_time_msec, 10-bit L1D_time_usec, and 10-bit L1D_time_nsec defined in L1D signaling (L1-Detail Signaling) are respectively correspond to Time_sec, Time_msec, Time_usec, and Time_nsec in ATSC 3.0, for example.

Details of L1B signaling and L1D signaling are disclosed in Non-Patent Document 1 below.

Non-Patent Document 1: ATSC Standard: Physical Layer Protocol (A/322)

(C) PLP_ID

C in FIG. 8 is a diagram illustrating a structure of an ALP packet in a case where PLP_ID is added to an ALP extension header (hereinafter, the ALP packet is also referred to as an ALP packet with PLP_ID).

In the ALP packet with PLP_ID, 3-bit Type, 1-bit PC, and 1-bit HM are arranged in the ALP header, and '1' is set as HM. In a case where "1" is set as HM, an ALP extension header (Additional header) is arranged following 11-bit Length.

This ALP extension header includes 5-bit Length_MSB, 1 bit-RSV, 1 bit-SIF, and 1-bit HEF.

In the ALP header of the ALP packet with PLP_ID in C in FIG. 8, "1" is set as HEF, and 3-byte header extension is performed for the ALP extension header.

8-bit Extension_type, 8-bit Extension_length, 6-bit PLP_ID, and 2-bit dummy data (dummy) are arranged in the header extension. In this example, since 6-bit PLP_ID is arranged as private user data (PUD), values of a type and a length corresponding to this arrangement are set in Extension_type and Extension_length, respectively.

Note that 6-bit L1D_plp_id defined in L1D signaling (L1-Detail Signaling) corresponds to this PLP_ID in ATSC 3.0, for example. PLP_ID is not necessary in the case of a Single PLP (S-PLP) mode but PLP_ID is required to identify PLP in the case of a Multiple PLP (M-PLP) mode. Details of the L1D signaling are disclosed in Non-Patent Document 1 above. Furthermore, details of the structure of the ALP packet are disclosed in Non-Patent Document 2 below.

Non-Patent Document 2: ATSC Standard: Link-Layer Protocol (A/330)

(Output Timing of ALP Packet)

Figure 9:
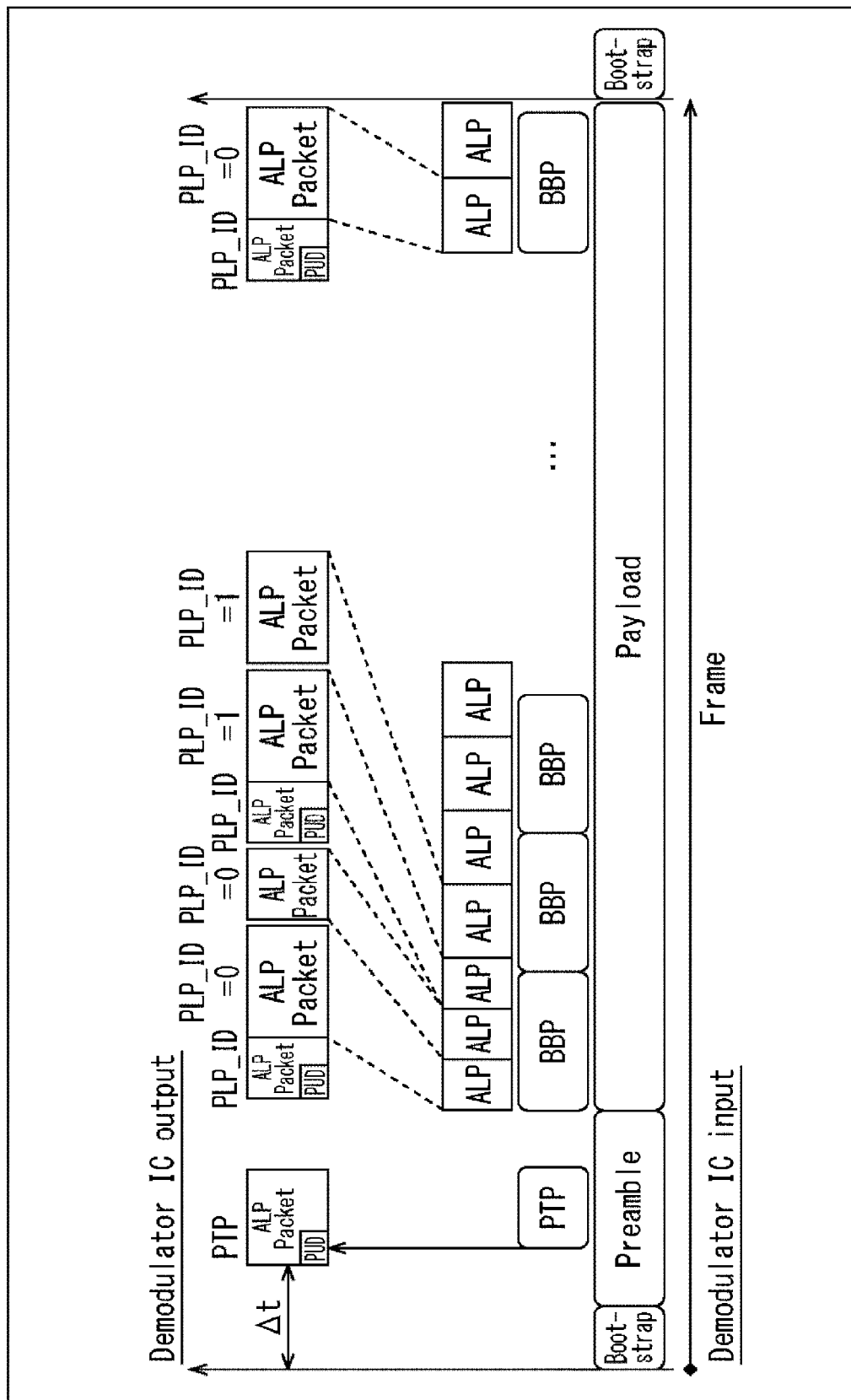
FIG. 9 is a diagram illustrating an example of output timing of an ALP packet.

FIG. 9 is a diagram illustrating an example of output timing of an ALP packet processed by the reception device 20.

FIG. 9 illustrates output timing of the ALP packet output from the demodulation circuit 201 to the processing circuit 202 via the physical interface 203 in the reception device 20. Note that, in FIG. 9, the horizontal direction represents a time (Time) and the vertical direction represents data, which is obtained by processing a frame and a packet in the demodulation circuit 201 as the demodulation IC, for each hierarchy in a stepwise manner from input to output.

In FIG. 9, data of a lowest level hierarchy is the physical layer frame. For example, the physical layer frame defined in ATSC 3.0 includes a bootstrap, a preamble, and a payload.

The preamble can include, for example, physical layer signaling such as L1B signaling (L1-Basic Signaling) and L1D signaling (L1-Detail Signaling). In this example, PTP as time information is arranged in the preamble. That is, PTP will be transmitted at predetermined timing.

In the demodulation circuit 201 of the reception device 20, the physical layer frame is processed by the demodulation unit 211 and the error correction unit 212, and one or a plurality of baseband (BB) packets (hereinafter also referred to as "BBPs") are extracted from the payload of the physical layer frame.

Furthermore, in the demodulation circuit 201, the BB packet is processed by the I/F unit 213, and one or a plurality of ALP packets is extracted. At this time, the I/F unit 213 causes (private user data (PUD)) of the ALP packet to include PTP as time information and PLP information including PLP_ID.

Note that, here, PLP_ID (for example, PLP_ID=1) is added only to the head ALP packet among the ALP packets continuously obtained from the same PLP (for example, PLP with PLP_ID=1) on the demodulation circuit 201 side. Meanwhile, the processing circuit 202 side can perform processing, regarding a packet group from an ALP packet to which certain PLP_ID (for example, PLP_ID=1) is added to an ALP packet one ALP packet before an ALP packet to which another PLP_ID (for example, PLP_ID=2) is added as ALP packets belonging to the same PLP (for example, PLP with PLP_ID=1).

As described above, since PLP_ID and PTP are added to the ALP packet output from the demodulation circuit 201 to the processing circuit 202 via the physical interface 203, the processing circuit 202 can identify which PLP the ALP packet input from the demodulation circuit 201 via the physical interface 203 belongs at the time of M-PLP on the basis of PLP_ID added to the ALP packet. Furthermore, the processing circuit 202 can perform clock recovery, for example, on the basis of the PTP added to the ALP packet.

Hereinafter, the content of the present technology will be described in order according to nine embodiments on the premise of the technical content.

(1) First Embodiment

First, a structure of the divided packet of a first embodiment will be described with reference to FIG. 10.

In the first embodiment, a divided packet obtained by dividing a variable-length ALP packet into a packet length (188 bytes) of a fixed-length TS packet and arranging the ALP packet in a payload, and adding a header to the payload, is output from a demodulation circuit 201 to a processing circuit 202 via a physical interface 203.

Figure 10:
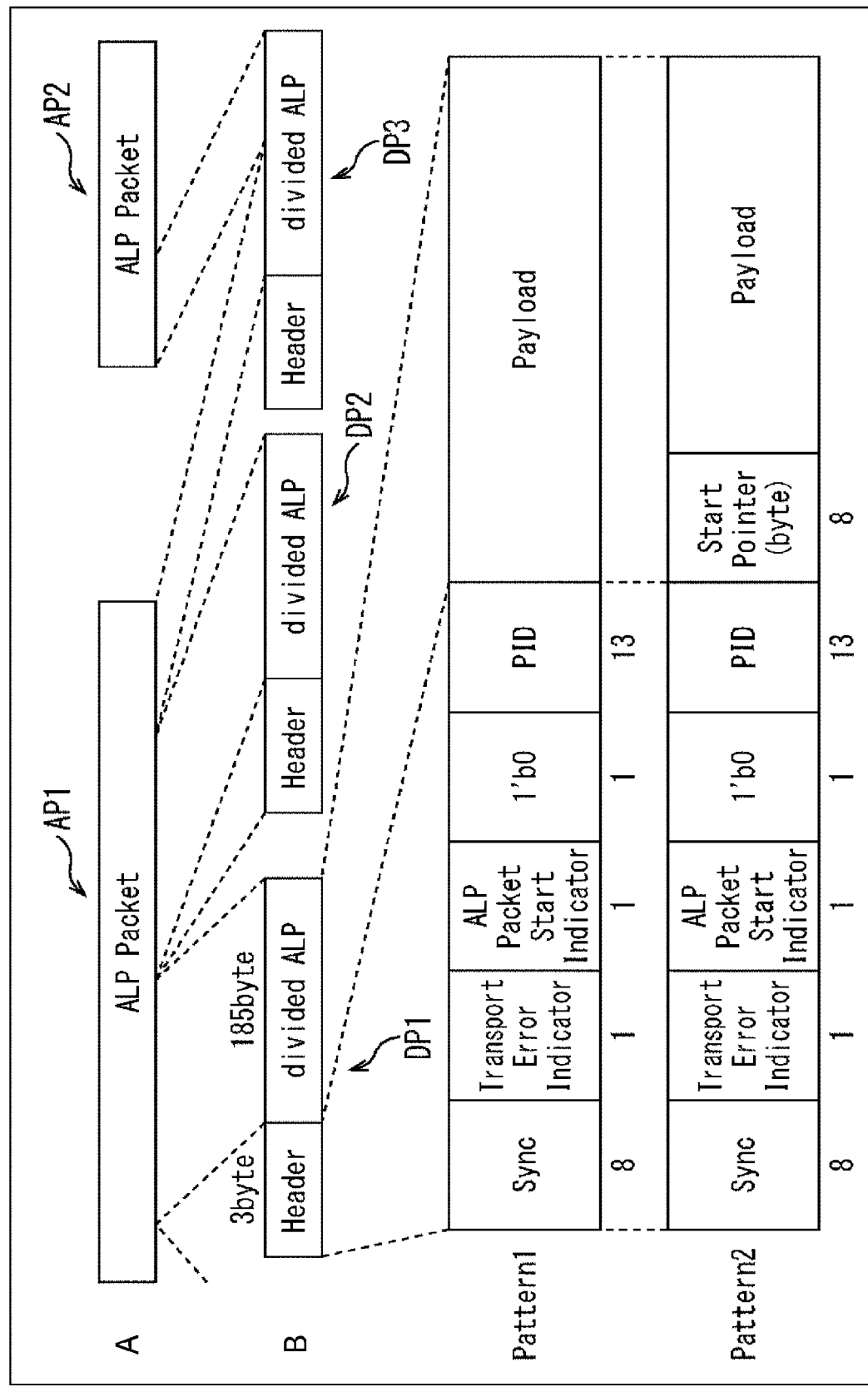
FIG. 10 is a diagram illustrating an example of a structure of a divided packet according to a first embodiment.

FIG. 10 illustrates packets processed by the demodulation circuit 201. A in FIG. 10 illustrates the ALP packet, and B in FIG. 10 illustrates the divided packet. Furthermore, two patterns of headers: pattern 1 and pattern 2 are illustrated as a divided header added to the divided packet.

FIG. 10 illustrates two continuous ALP packets (AP1 and AP2), of a plurality of ALP packets sequentially processed in time series in the demodulation circuit 201. A part of the head ALP packet AP1 is cut out and the divided header is added to generate a divided packet DP1. Here, since the packet length of the TS packet is 188 bytes, the ALP packet (divided ALP) of 185 bytes is cut out to set the packet length of the divided packet DP1 to be 188 bytes, in other words, to be arranged in a payload with 185 bytes excluding a 3-byte divided header (Header), in accordance with the packet length of the TS packet.

The divided packet DP1 thus obtained includes the 3-byte divided header and the 185-byte payload, and the packet length is 188 bytes. In other words, here, divided packets in units of 188 bytes are sequentially generated by sequentially processing the ALP packet. Specifically, the divided packet DP1 and a divided packet DP2 are generated by cutting out a part of the ALP packet AP1, and a divided packet DP3 is generated by cutting out a part of the ALP packet AP1 and the ALP packet AP2.

Here, the divided header of the divided packet can have a structure illustrated in the pattern 1 or the pattern 2.

In other words, 8-bit Sync, 1-bit Transport Error Indicator, 1-bit ALP Packet Start Indicator, and 13-bit PID are arranged in the divided header of the pattern 1.

Sync is a synchronization byte and is, for example, '0x47'.

Transport Error Indicator is an error indicator, and has a fixed value of, for example, '1'b0'. Furthermore, Transport Error Indicator may be a flag indicating the presence or absence of a bit error in the divided packet. For example, in a case where Transport Error Indicator is '1', the indicator indicates that at least one uncorrectable error is present in the divided packet.

ALP Packet Start Indicator is a flag (ALP packet head presence/absence flag) indicating the presence or absence of a pointer (hereinafter also referred to as head pointer) indicating the position of the head of the ALP packet arranged in the payload of the divided packet. For example, in a case where ALP Packet Start Indicator indicates '0', the indicator indicates that the head pointer is not present.

That is, the divided header of the pattern 1 does not include the head pointer because the ALP Packet Start Indicator is '0'. In the example in FIG. 10, the payloads of the divided packets DP1 and DP2 do not include the position of the head of the ALP packet AP1. Therefore, ALP Packet Start Indicator of '0' is arranged and the head pointer is not arranged in the divided headers.

An arbitrary fixed PID is assigned to PID.

Furthermore, the divided header of the pattern 2 indicates that ALP Packet Start Indicator is '1' and the head pointer is present, and is different in that 8-byte Start Pointer is added, as compared with the divided header of the pattern 1.

Start Pointer is a head pointer that indicates the position the head of the ALP packet arranged in the payload of the divided packet. In the example in FIG. 10, the payload of the divided packet DP3 includes the position of the head of the ALP packet AP2. Therefore, ALP Packet Start Indicator of '1' is arranged and the head pointer indicating the position of the head of the ALP packet AP2 is arranged in the divided header.

As described above, the divided header of divided packet DP3 is the pattern 2, whereas the divided headers of the divided packets DP1 and DP2 are the pattern 1 because the position of the head of the ALP packet is not included in the payloads of the divided packets DP1 and DP2. Note that the divided header of the pattern 2 is smaller in size of the payload in the divided packet by the amount of the arrangement of 8-byte Start Pointer than the divided header of the pattern 1.

In the first embodiment, the demodulation circuit 201 side processes the ALP packet to generate the divided packet, and outputs the divided packet to the processing circuit 202 via the physical interface 203, and the processing circuit 202 side processes the divided packet from the demodulation circuit 201 to generate (restore) the ALP packet.

At that time, the ALP packet (divided ALP) of 185 bytes cut out from the variable-length ALP packet is arranged in the payload of the divided packet. Therefore, information (restoration information) for restoring the ALP packet is included in the divided header, so that the processing circuit 202 side can restore the ALP packet from the divided packet.

As the restoration information, information corresponding to the TS header of the TS packet such as Transport Error Indicator can be included, for example. Furthermore, as the information for restoring the ALP packet, the head pointer (Start Pointer) according to ALP packet Start Indicator can be included.

In other words, the ALP packet arranged in the payload of the divided packet has a variable length, and when the ALP packet is cut out by 185 bytes at a time in accordance with the fixed-length TS packet, the position of the head of the ALP packet cannot be specified in the divided packet. Therefore, as illustrated in FIG. 10, the head pointer (Start Pointer) is included in the divided header of the divided packet, whereby the processing circuit 202 can specify the position of the head of the ALP packet in the divided packet and can restore the ALP packet.

Note that the above-described pattern 1 and pattern 2 are examples of the structure of the divided header, and other pieces of information can be included. For example, information included in the TS header of the TS packet can be arranged instead of the next 1 bit ('1'b0') of ALP Packet Start Indicator or Transport Error Indicator.

The first embodiment has been described above.

(2) Second Embodiment

Next, a structure of a divided packet of a second embodiment will be described with reference to FIG. 11.

By the way, in the above-described first embodiment, the demodulation circuit 201 side includes the head pointer (Start Pointer) in the divided header when generating the divided packet, so that the processing circuit 202 side can specify the position of the head of the ALP packet to restore the ALP packet in a divided packet. However, in a case where two or more positions of heads of ALP packets are present in the divided packet, all the positions of the heads cannot be specified only with a head pointer.

Therefore, in the second embodiment, a position of a first head, of positions of heads of ALP packets arranged in a payload of a divided packet, is specified with a position of a head indicated by a head pointer, and a position of a second or subsequent head is specified with the position of the head indicated by the head pointer and a packet length of the ALP packet.

Figure 11:
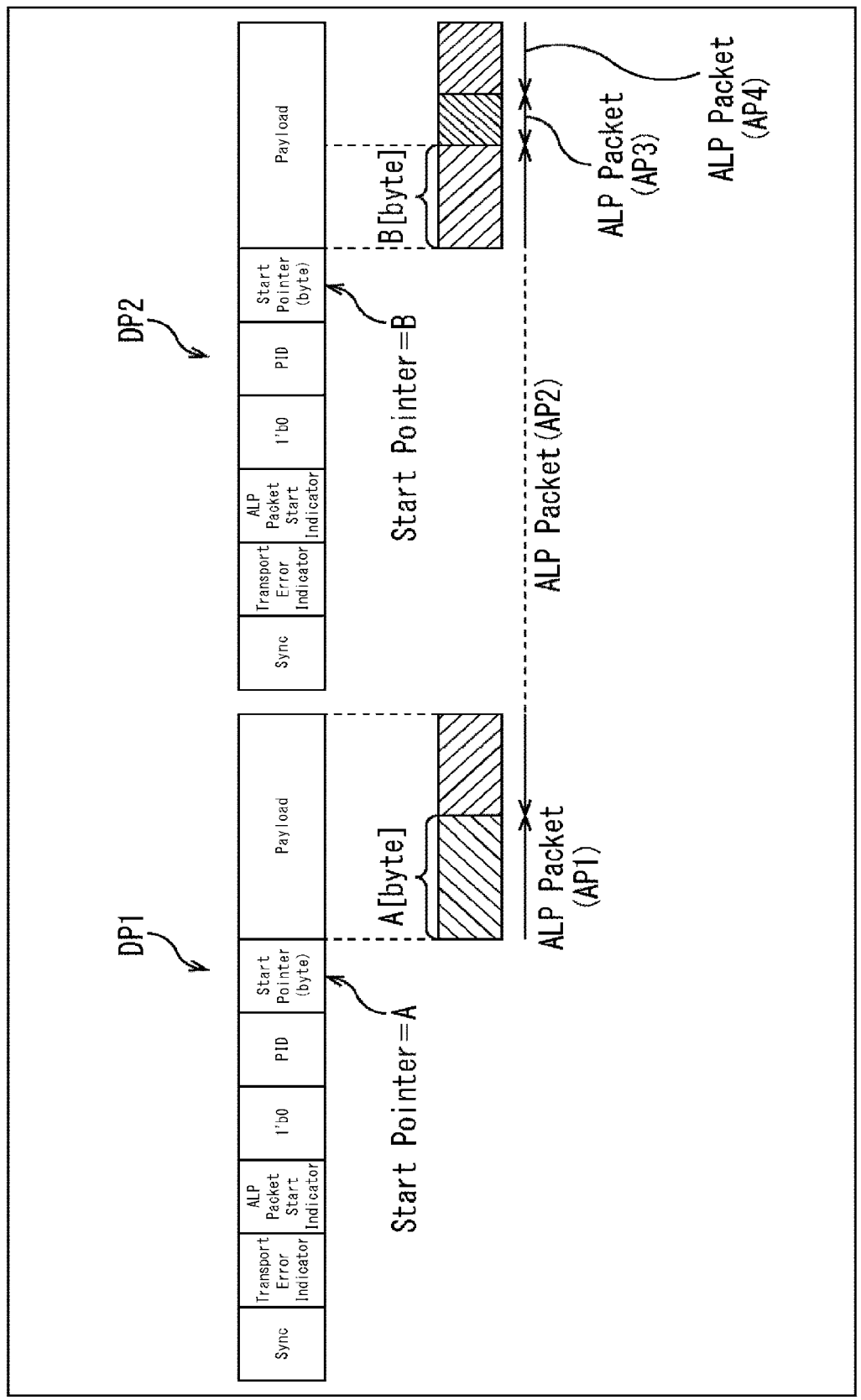
FIG. 11 is a diagram illustrating an example of a structure of a divided packet according to a second embodiment.

FIG. 11 illustrates a packet processed by a processing circuit 202. FIG. 11 illustrates two continuous divided packets (DP1 and DP2), of a plurality of divided packets sequentially processed in time series by the processing circuit 202.

A divided header of the head divided packet DP1, of the two continuous divided packets, includes Start Pointer='A' as a head pointer, and the head pointer (Start Pointer='A') indicates the position of a head of an ALP packet arranged in a payload, in other words, the position of a head of an ALP packet AP2.

In other words, in the payload of the head divided packet DP1, a part of an ALP packet AP1 from a middle to the end of the ALP packet AP1 and a part of the ALP packet AP2 from the head to the middle of the ALP packet AP2 are arranged. The head pointer (Start Pointer='A') included in the divided header indicates the number of bytes from the position of the head of the payload to the position of the head of the ALP packet AP2.

Meanwhile, the second divided packet DP2 following the head divided packet DP1, of the two continuous divided packets, includes Start Pointer='B' as a head pointer, and the head pointer (Start Pointer='B') indicates the position of a head of an ALP packet arranged in a payload, in other words, the position of a head of an ALP packet AP3.

In other words, in the payload of the second divided packet DP2, a part of the ALP packet AP2 from a middle to the end of the ALP packet AP2 and (from the head to the end of) the ALP packet AP3 are arranged. The head pointer (Start Pointer='B') included in the divided header indicates the number of bytes from the position of the head of the payload to the position of the head of the ALP packet AP3.

Here, an ALP packet AP4 is arranged following the ALP packet AP3 in the payload of the second divided packet DP2. Although the position of the head of the ALP packet AP3 can be specified with the head pointer (Start Pointer='B') included in the divided header, the position of a head of the ALP packet AP4 following the ALP packet AP3 cannot be specified.

Therefore, in the second embodiment, a position past a packet length of the ALP packet AP3 from the position of the head of the ALP packet AP3 specified with the head pointer (Start Pointer='B') is regarded as the position of the head of the ALP packet AP4, using the packet length of the ALP packet AP3, to specify the position of the head of the ALP packet AP4.

In the second embodiment, the demodulation circuit 201 side processes the ALP packet to generate the divided packet, and outputs the divided packet to the processing circuit 202 via the physical interface 203, so that the processing circuit 202 side processes the divided packet from the demodulation circuit 201 to generate (restore) the ALP packet.

At that time, an ALP packet (divided ALP) of 185 bytes cut out from a variable-length ALP packet is arranged in the payload of the divided packet. Therefore, information for restoring the ALP packet is included in the divided header, so that the processing circuit 202 side can restore the ALP packet from the divided packet.

As the information for restoring the ALP packet, the head pointer (Start Pointer) is included in the divided header of the divided packet, so that the processing circuit 202 can specify the position of the head of the ALP packet in the divided packet and can restore the ALP packet.

Furthermore, in the case where two or more positions of the heads of the ALP packets are present in the payload of the divided packet, the position of the first head is specified with the position indicated by the head pointer, and the position of the second or subsequent head is specified using the head pointer and the packet length of the target ALP packet of the head pointer.

Note that the packet length of the ALP packet is included in the header of the target ALP packet, for example. However, the packet length of the ALP packet may be acquired by another technique.

Furthermore, FIG. 11 illustrates the case in which the positions of the heads of the ALP packet AP3 and the ALP packet AP4 are included in the payload of the divided packet DP2. However, in a case where the position of the head of the ALP packet is further included, the position of the head of the ALP packet can be similarly specified using the head pointer and the packet length of the target ALP packet of the head pointer.

For example, in a case where the position of a head of an ALP packet AP5 is included in the payload of the divided packet DP2 in addition to the positions of the heads of the ALP packet AP3 and the ALP packet AP4, the position past the packet lengths of the ALP packet AP3 and the ALP packet AP4 from the position of the head of the ALP packet AP3 specified with the head pointer (Start Pointer='B') is regarded as the position of the head of the ALP packet AP5, thereby specifying the position of the head of the ALP packet AP5.

The second embodiment has been described above.

(3) Third Embodiment

Next, a structure of a divided packet of a third embodiment will be described with reference to FIG. 12.

In the third embodiment, an ALP packet with PLP_ID illustrated in C in FIG. 8 is included as an ALP packet arranged in a payload of a divided packet.

Figure 12:
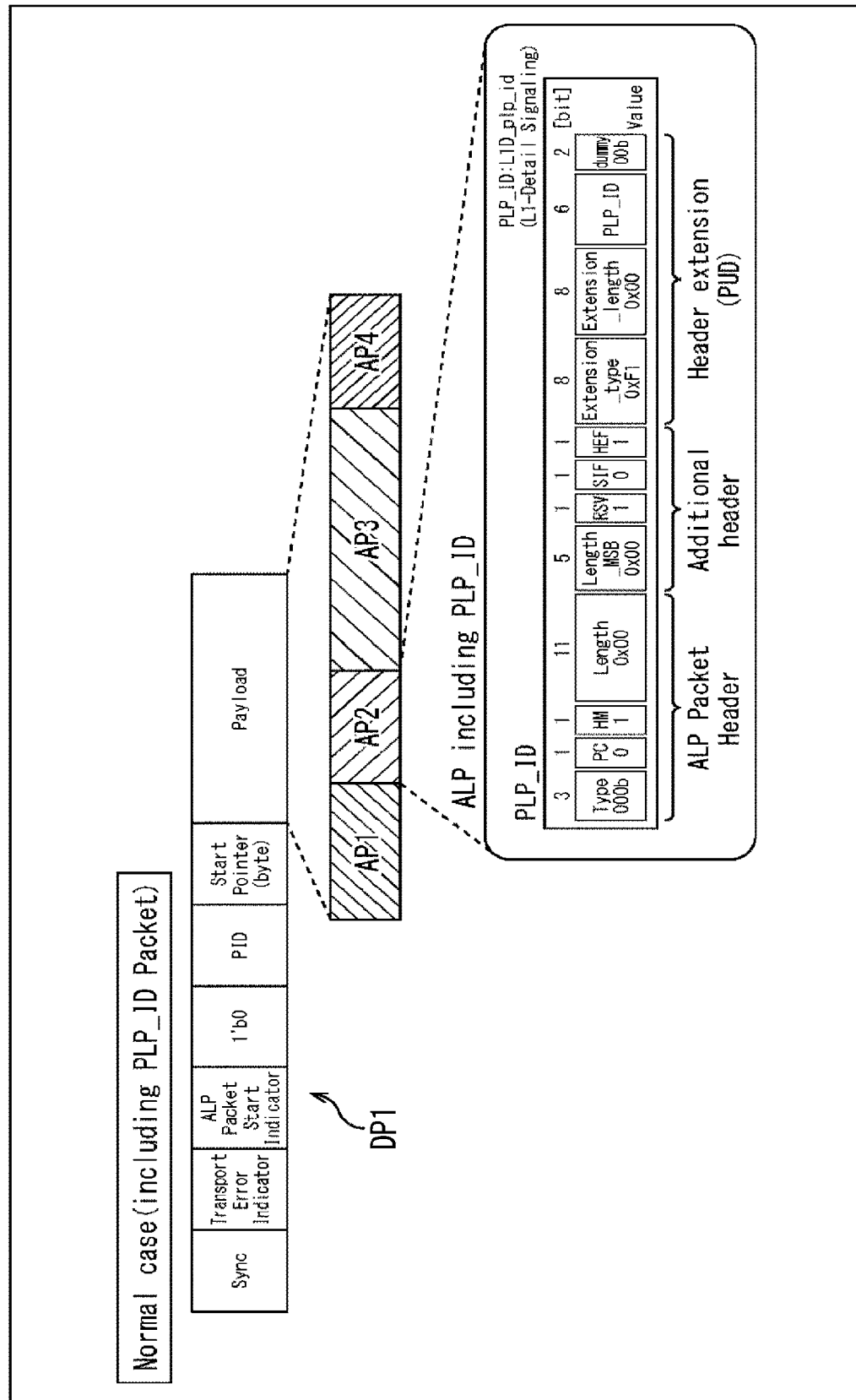
FIG. 12 is a diagram illustrating an example of a structure of a divided packet according to a third embodiment.

FIG. 12 illustrates a packet processed by the processing circuit 202. FIG. 12 illustrates a divided packet DP1, of divided packets sequentially processed by a processing circuit 202.

8-bit Sync, 1-bit Transport Error Indicator, 1-bit ALP Packet Start Indicator, 13-bit PID, and 8-byte Start Pointer are included in a divided header of the divided packet DP1, which has been described above.

Furthermore, in the payload of the divided packet DP1, a part of an ALP packet AP1 from a middle to the end of the ALP packet AP1, the whole of an ALP packet AP2, the whole of an ALP packet AP3, and a part of an ALP packet AP4 from the head to the middle of the ALP packet AP4 are arranged.

Here, in the ALP packet AP2, '1' is set as HM in an ALP header (ALP Packet Header), and an ALP extension header (Additional header) is arranged. In this ALP extension header, '1' is set as HEF, and header extension is performed.

Then, 6-bit PLP_ID is arranged in this header extension. This PLP_ID corresponds to 6-bit L1D pip id included in L1D signaling (L1-Detail Signaling) defined in ATSC 3.0, for example, which has been described above.

In other words, in ATSC 3.0, a transmission device 10 can cope with up to 64 PLPs for each predetermined frequency band. In a reception device 20, a demodulation circuit 201 side adds PLP_ID to an ALP packet, so that the processing circuit 202 side can specify which PLP the ALP packet input via a physical interface 203 belongs at the time of M-PLP on the basis of PLP_ID obtained from the ALP packet.

The third embodiment has been described above.

(4) Fourth Embodiment

Next, a structure of a divided packet of a fourth embodiment will be described with reference to FIG. 13.

In the fourth embodiment, an ALP packet with PTP illustrated in B in FIG. 8 is included as an ALP packet arranged in a payload of a divided packet.

Figure 13:
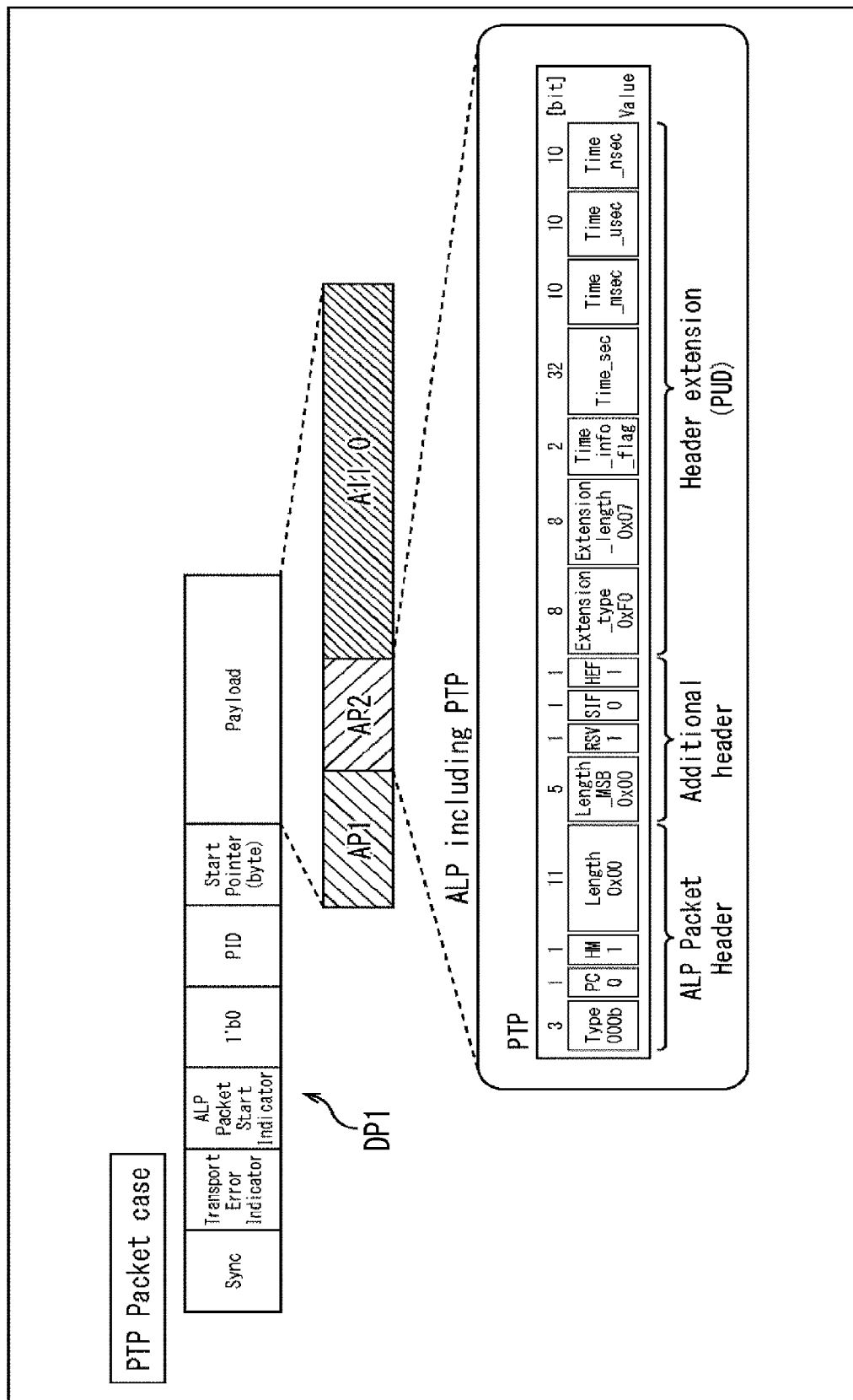
FIG. 13 is a diagram illustrating an example of a structure of a divided packet according to a fourth embodiment.

FIG. 13 illustrates a packet processed by the processing circuit 202. FIG. 13 illustrates a divided packet DP1, of divided packets sequentially processed by a processing circuit 202.

8-bit Sync, 1-bit Transport Error Indicator, 1-bit ALP Packet Start Indicator, 13-bit PID, and 8-byte Start Pointer are included in a divided header of the divided packet DP1, which has been described above.

Furthermore, in the payload of the divided packet DP1, a part of an ALP packet AP1 from a middle to the end of the ALP packet AP1 and the whole of an ALP packet AP2 are arranged, and in a remaining region, zero padding is performed to set the divided packet DP1 to have a fixed length (188 bytes).

Here, in the ALP packet AP2, '1' is set as HM in an ALP header (ALP Packet Header), and an ALP extension header (Additional header) is arranged. In this ALP extension header, '1' is set as HEF, and header extension is performed.

Then, in this header extension, 32-bit Time_sec, 10-bit Time_msec, 10-bit Time_usec, and 10-bit Time_nsec are arranged according to 2-bit Time_info_flag.

For example, in a case of Time_info_flag='01', time information in seconds (Time_sec) and time information in milliseconds (Time_msec) are arranged. Furthermore, for example, in a case of Time_info_flag='10', time information in microseconds (Time_usec) is arranged in addition to the time information in seconds and milliseconds (Time_sec and Time_msec). Furthermore, for example, in a case of Time_info_flag='11', time information in nanoseconds (Time_nsec) is arranged in addition to the time information in seconds, milliseconds, and microseconds (Time_sec, Time_msec, and Time_usec).

As described above, the time obtained from these pieces of time information can be made to have precision in microseconds, nanoseconds, or the like. Therefore, for example, even in a physical layer frame in which a frame length (frame time) does not become an integer millisecond unit, an error (jitter) from the time indicated by the time information can be suppressed.

Furthermore, in a case where the ALP packet including the time information is arranged in the payload, zero passing is performed for the remaining region after the ALP packet is arranged, thereby causing the divided packet to have the fixed length (188 bytes). Note that, here, zero padding has been described as an example. However, for example, another technique may be used such as inserting an arbitrary fixed sequence to the remaining region.

As a result, in the processing circuit 202, when waiting for an ALP packet next to the ALP packet including the time information when processing the divided packet from a demodulation circuit 201, a jitter occurs by the amount of the waiting. In the case of arranging the ALP packet including the time information in the payload of the divided packet, the demodulation circuit 201 outputs the divided packet to the processing circuit 202 after padding all zero ("All 0" in FIG. 13), whereby the processing circuit 202 can suppress the jitter of the time information.

The fourth embodiment has been described above.

(5) Fifth Embodiment

Next, a structure of a divided packet of a fifth embodiment will be described with reference to FIGS. 14 and 15.

In the above-described first to fourth embodiments, when the variable-length ALP packet is divided according to the packet length (188 bytes) of the fixed-length TS packet and the divided packet is arranged in the payload, the divided packet is generated regardless of boundaries of the ALP packets.

Figure 14:
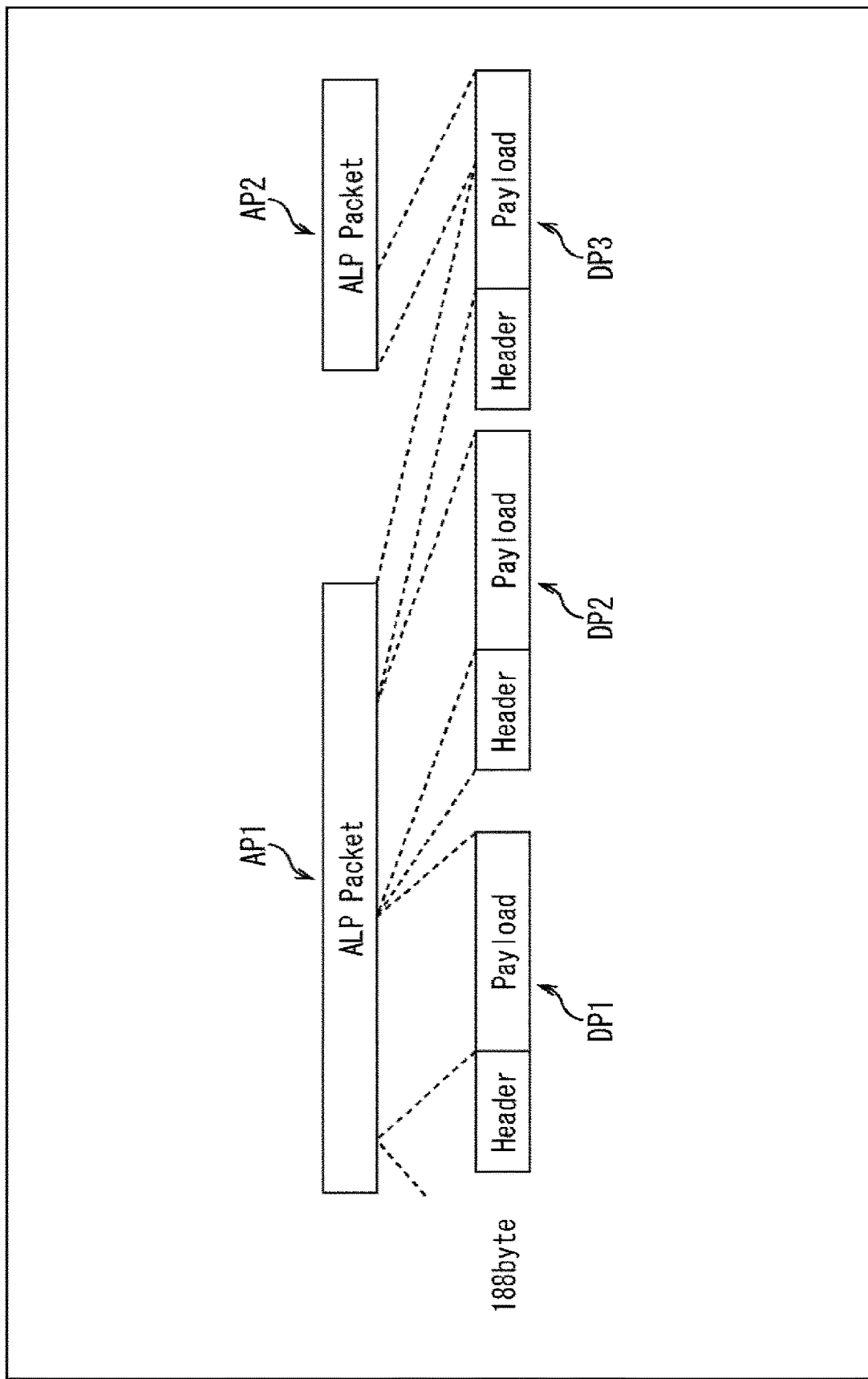
FIG. 14 is a diagram illustrating an example of a structure of a divided packet according to a fifth embodiment.

In other words, as illustrated in FIG. 14, a part of the head ALP packet AP1 is cut out and the divided header is added, so that the divided packet DP1 and the divided packet DP2 are generated in order. Furthermore, a part of the ALP packet AP1 and a part of the ALP packet AP2 are cut out and the divided header is added, so that the divided packet DP3 is generated.

At this time, since the head of the ALP packet AP2 is in the middle of the payload of the divided packet DP3, the boundary of the ALP packet does not match the boundary of the divided packet.

In the fifth embodiment, in a case of sequentially cutting out an ALP packet and sequentially arranging the ALP packet in a payload of a divided packet, when a boundary of the ALP packet arrives, zero padding is performed for a remaining region according to a fixed length (188 bytes) of the divided packet to match a head of the ALP packet and a head of the payload of the divided packet.

Figure 15:
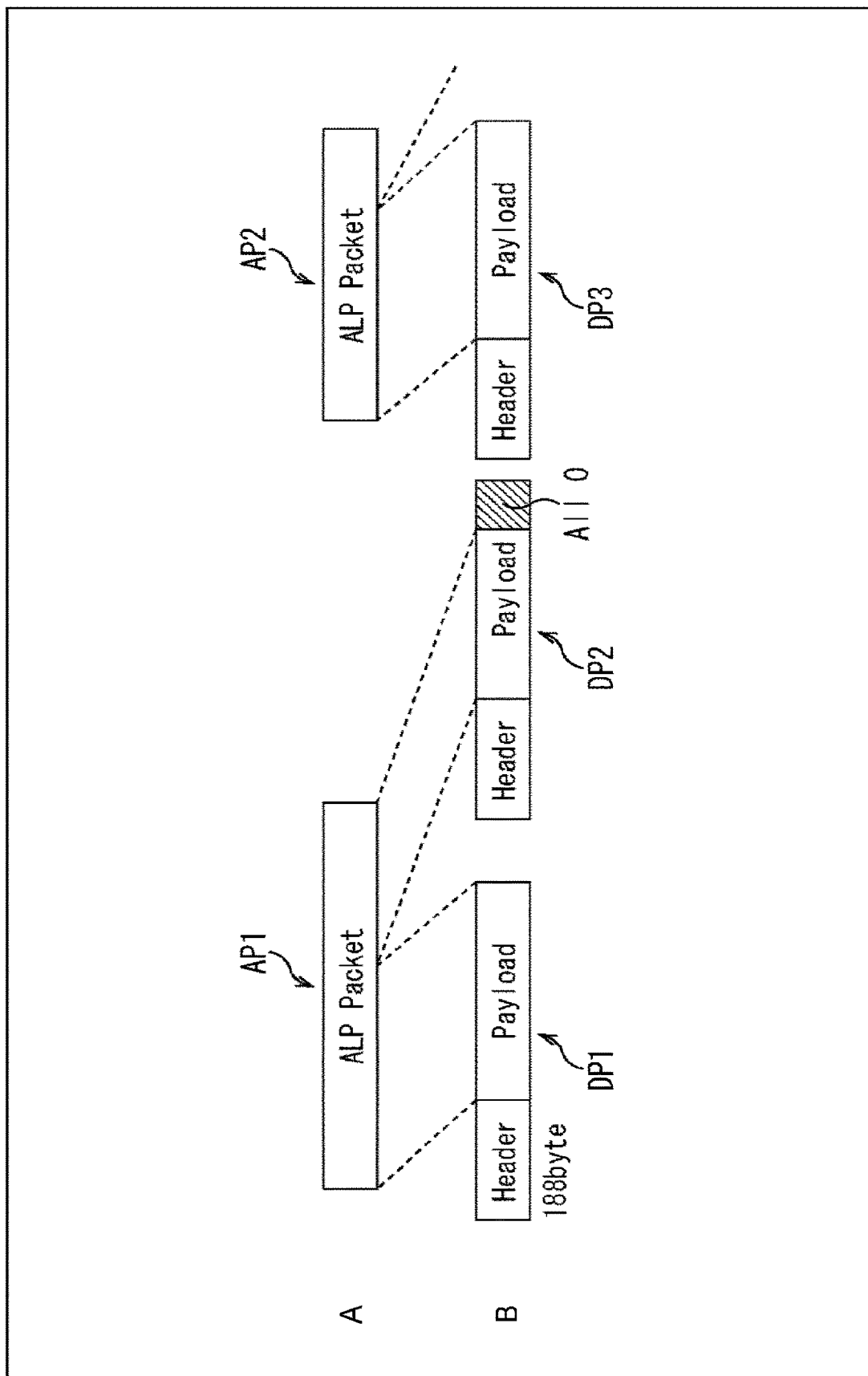
FIG. 15 is a diagram illustrating an example of a structure of a divided packet according to the fifth embodiment.

FIG. 15 illustrates a packet processed by a demodulation circuit 201. A in FIG. 15 illustrates an ALP packet, and B in FIG. 15 illustrates a divided packet.

FIG. 15 illustrates two continuous ALP packets (AP1 and AP2), of a plurality of ALP packets sequentially processed in time series in the demodulation circuit 201. A part of the head ALP packet AP1 is cut out and the divided header is added to generate a divided packet DP1. Here, since the packet length of the TS packet is 188 bytes, the ALP packet of 185 bytes is cut out to set the packet length of the divided packet DP1 to be 188 bytes, in other words, to be arranged in a payload with 185 bytes excluding a 3-byte divided header (Header), in accordance with the packet length of the TS packet.

The divided packet DP1 thus obtained includes the 3-byte divided header and the 185-byte payload, and the packet length is 188 bytes. In other words, here, divided packets in units of 188 bytes are sequentially generated by sequentially processing the ALP packet. Specifically, the divided packet DP1 is generated by cutting out a part of the ALP packet AP1.

Furthermore, a divided packet DP2 is generated by cutting out a part of the ALP packet AP1, but data of the ALP packet AP1 ends in the middle of a payload of a divided packet DP2, and the middle part is the boundary of the ALP packet AP1 and the ALP packet AP2.

At this time, zero padding is performed for the remaining region according to the fixed length (188 bytes) of the divided packet DP2. In other words, the divided packet DP2 has the fixed length (188 bytes) by arranging the data of the part of the ALP packet AP1 from the middle to the end of the ALP packet AP1 in the payload and performing the zero padding for the remaining region.

Therefore, data of a part of the ALP packet AP2 from the head to the middle of the ALP packet AP2 is arranged in a payload of a divided packet DP3 next to the divided packet DP2, and the boundary of the ALP packet AP1 and the ALP packet AP2 matches a boundary of the divided packet DP2 and the divided packet DP3.

Similarly, the divided packets DP3 and DP4 in units of 188 bytes are sequentially generated by cutting out a part of the ALP packet AP2, and for example, in a case where data of the ALP packet AP2 ends in the middle of the payload of the divided packet DP4, zero padding is performed to adjust the packet length to be 188 bytes.

Note that, in the above description, a case where zero padding is performed for the remaining region according to the fixed length of the divided packet has been described. However, the zero padding may be performed for a region in the middle of (the payload of) the divided packet. For example, in the divided packet, it is only required to arrange the data of the ALP packet in the payload after performing the zero padding, following the divided header, to adjust the packet length to be 188 bytes.

Furthermore, in the above description, the zero padding has been described as an example. However, for example, another technique may be used as long as the packet length can be adjusted to the fixed length such as inserting an arbitrary fixed sequence to the remaining region according to the fixed length of the divided packet.

As described above, in a case where data of a certain ALP packet ends when an ALP packet is cut out and is arranged in a payload of a divided packet, zero padding is performed for the remaining region according to the fixed length of the divided packet, rather than immediately cutting out the next ALP packet, to arrange head data of the next ALP packet in the head of the payload of the next divided packet.

As a result, the boundary of the ALP packet always matches the boundary of the divided packet, and it is clear that the position of the head of the ALP packet becomes the position of the head of the payload of the divided packet. Therefore, for example, the head pointer does not need to be included in the divided header as restoration information, and the amount of information of the restoration information included in the divided header can be reduced.

The fifth embodiment has been described above.

(6) Sixth Embodiment

Next, a structure of a divided packet of a sixth embodiment will be described with reference to FIG. 16.

In the sixth embodiment, in a case of cutting out an ALP packet and arranging a payload of a divided packet, zero padding is performed for a remaining region according to a fixed length (188 bytes) of the divided packet, similarly to the above-described fifth embodiment, but a divided packet to which a divided header is added, of divided packets, is set only to a divided packet including a head of the ALP packet in the payload.

FIG. 16 illustrates a packet processed by the demodulation circuit 201. A in FIG. 16 illustrates an ALP packet, and B in FIG. 16 illustrates a divided packet.

FIG. 16 illustrates two continuous ALP packets (AP1 and AP2), of a plurality of ALP packets sequentially processed in time series in a demodulation circuit 201. A part of the head ALP packet AP1 is cut out and a divided header is added to generate a divided packet DP1. In other words, the divided packet DP1 thus obtained includes a 3-byte divided header and a 185-byte payload, and the packet length is 188 bytes.

Furthermore, a divided packet DP2 is generated by cutting out a part of the ALP packet AP1, but a divided header is not added to the divided packet DP2 and the divided packet DP2 includes only a payload including data cut out from the ALP packet AP1. In other words, the divided packet DP2 thus obtained includes only a 188-byte payload, and the packet length of the divided packet DP2 is 188 bytes.

Furthermore, a divided packet DP3 is generated by cutting out a part of the ALP packet AP1, but a divided header is not added to the divided packet DP3 and the divided packet DP3 includes only a payload including data cut out from the ALP packet AP1, and zero padding is performed for a 188-byte remaining region. In other words, the divided packet DP3 thus obtained includes an X-byte payload and (188−X)-byte zero padding (All 0), and the packet length of the divided packet DP3 is 188 bytes.

Similarly, divided packets DP4 and DP5 in units of 188 bytes are sequentially generated by cutting out a part of the ALP packet AP2, and but for example, a divided header is added only to the divided packet DP4 including a head of the ALP packet AP2, and the divided packet DP5 not including the head of the ALP packet AP2 includes only a payload. Note that, at this time, in a case where data of the ALP packet AP2 ends in the middle of the payload of the divided packet DP5, zero padding is performed to adjust the packet length of the divided packet DP5 to be 188 bytes.

As described above, in a case of cutting out an ALP packet and arranging a payload of a divided packet, zero padding is performed for a remaining region according to a fixed length of the divided packet, thereby matching a boundary of the ALP packet with a boundary of the divided packet, as well as causing a divided packet to which a divided header is added, of divided packets, to be only a divided packet including a head of the ALP packet in the payload.

Thereby, a divided packet to which no divided header is added is present among divided packets. However, data of the ALP packet can be included in the payload by the amount of reduction of the divided header. Therefore, data transmission efficiency can be improved.

The sixth embodiment has been described above.

(7) Seventh Embodiment

Next, a structure of a divided packet of a seventh embodiment will be described with reference to FIGS. 17 to 19.

In the seventh embodiment, correspondence between header information (restoration information) included in a divided header to be added to a divided packet, and a division mode of the divided packet.

(Table of Correspondence)

FIG. 17 is a diagram illustrating correspondence between header information of a divided header and a division mode of a divided packet.

Here, as the division mode of the divided packet, there are three modes of the above-described, first, second, and third modes.

In other words, the first division mode is to cut out an ALP packet, arrange the ALP packet in a payload, and add a divided header to generate a divided packet (corresponding to "simple division"). For example, among the above-described embodiments, the first embodiment illustrated in FIG. 10 corresponds to the first division mode.

Furthermore, the second division mode is to perform zero padding for a remaining region according to a fixed length of a divided packet when cutting out an ALP packet and arranging the ALP packet in a payload of the divided packet (corresponding to "division+zero padding"). For example, among the above-described embodiments, the fifth embodiment illustrated in FIG. 15 corresponds to the second division mode.

Furthermore, the third division mode is to perform zero padding for a remaining region according to a fixed length of a divided packet, similarly to the second division mode, but a divided packet to which a divided header is added, of divided packets, is set only to a divided packet including a head of an ALP packet in a payload ("division+zero padding+header reduction"). For example, among the above-described embodiments, the sixth embodiment illustrated in FIG. 16 corresponds to the third division mode.

As illustrated in FIG. 17, the header information of the divided header can include, for example, synchronization byte, error indicator, PTP presence/absence flag, ALP packet head presence/absence flag, PLP_ID switching flag, PTP, head pointer, PLP_ID switching head pointer, and packet ID.

The synchronization byte (Sync) is used on a processing circuit 202 side for detecting the head of the divided packet. For example, 8 bits are assigned to the synchronization byte, and '0x47' is set.

Furthermore, since the synchronization byte is compatible with all of the first, second, and third division modes, the synchronization byte can be included in the divided header of the divided packet formed according to these division modes.

The error indicator (Error Indicator) is a flag indicating the presence or absence of an error of the ALP packet arranged in the payload of the divided packet. For example, 1 bit is assigned to the error indicator, and '1'b1' is set in a case where an error is present in some of the ALP packets in the payload, and '1'b0' is set in a case where no error is present.

Furthermore, since the error indicator is compatible with all of the first, second, and third division modes, the error indicator can be included in the divided header of the divided packet formed according to these division modes.

The PTP presence/absence flag (PTP Indicator) is a flag indicating the presence/absence of PTP (time information) arranged in the divided header of the divided packet. For example, 1 bit is assigned to the PTP presence/absence flag, and '1'b1' is set in a case where PTP is present in the divided header, and '1'b0' is set in a case where PTP is not present.

Furthermore, since the PTP presence/absence flag is compatible with all of the first, second, and third division modes, the PTP presence/absence flag can be included in the divided header of the divided packet formed according to these division modes.

Note that, in a case where '1'b1' is set as the PTP presence/absence flag, PTP is arranged in the divided header. At this time, in a case where the time information is arranged in the divided header of the divided packet, similarly to the case described in the fourth embodiment, zero padding is performed for the remaining region to cause the divided packet to have a fixed length (188 bytes). Then, such zero padding is performed so that a boundary of the ALP packet matches with a boundary of the divided packet, which substantially similar to the fact that only PTP is arranged in the payload.

The ALP packet head presence/absence flag (ALP Packet Start Indicator) is a flag indicating the presence or absence of a head pointer indicating the position of the head of the ALP packet arranged in the payload of the divided packet. For example, 1 bit is assigned to the ALP packet head presence/absence flag, and '1'b1' is set in a case where the head of the ALP packet is present in the payload and the head pointer indicating the position of the head is present, and '1'b0' is set in a case where the head of the ALP packet is not present and the head pointer is not present.

Furthermore, since the ALP packet head presence/absence flag is compatible with all of the first, second, and third division modes, the ALP packet head presence/absence flag can be included in the divided header of the divided packet formed according to these division modes.

Note that, in the case of the second division mode, the zero padding is performed. Thus when '1'b1' is set as the ALP packet head presence/absence flag, the head of the payload of the divided packet to which the divided header is added represents the head of the ALP packet. Furthermore, in the case of the third division mode, the zero padding is performed and reduction of the divided header is further performed. Thus the head of (the payload) of the divided packet to which the divided header is added represents the head of the ALP packet.

The PLP_ID switching flag (PLP Indicator) is a flag indicating the presence/absence of switching of PLP_ID in the payload of the divided packet. For example, 1 bit is assigned to the PLP_ID switching flag, and '1'b1' is set in a case where the PLP_ID is switched in the payload, and '1'b0' is set in a case where PLP_ID is not switched.

Furthermore, since the PLP_ID switching flag is compatible with the first division mode, the PLP_ID switching flag can be included in the divided header of the divided packet formed according to the first division mode. Note that, in the first division mode, when including the PLP_ID switching flag in the divided header, the PLP_ID switching flag can be used in a case where PLP_ID changes once in the 188-byte divided packet, but the PLP_ID switching flag cannot be used in a case where PLP_ID changes twice.

Note that, in the cases of the second and third division modes, the zero padding is performed, and the head of the ALP packet always matches the head of the payload of the divided packet and the switching of PLP_ID matches the head of the payload of the divided packet. Therefore, the PLP_ID switching flag is not necessary.

PTP is 8-bit time information. PTP is used in combination with the PTP presence/absence flag, and is arranged in the divided header in a case where the PTP presence/absence flag indicates that PTP is present.

Furthermore, since PTP is compatible with all of the first, second, and third division modes, PTP can be included in the divided header of the divided packet formed according to these division modes. However, in a case where PTP is arranged in the divided packet in these division modes, transmission of the ALP packet with PTP is not necessary.

The head pointer (Start Pointer) is a pointer that indicates the position the head of the ALP packet arranged in the payload of the divided packet, and 8 bits are assigned. The head pointer is used in combination with the ALP packet head presence/absence flag, and is arranged in the divided header in a case where the ALP packet head presence/absence flag indicates that the head pointer is present.

Furthermore, the head pointer is compatible with the first division mode only, and can be included in the divided header of the divided packet formed according to the first division mode. Note that, in the cases of the second and third modes, the zero padding is performed, and the head of the ALP packet always matches the head of the divided packet. Therefore, the head pointer is unnecessary. Note that, in a case where the zero padding is performed for a region in the middle of the divided packet such as immediately after the divided header, for example, in the cases of the second and third division modes, the position of the head of the ALP packet following the region may be indicated by the head pointer.

The PLP_ID switching head pointer (PLP_ID Pointer) is a pointer that indicates the position of the head of the ALP packet in a case where PLP_ID is switched, and 8 bits are assigned. The PLP_ID switching top pointer is used in combination with the PLP_ID switching flag, and is arranged in the divided header in a case where the PLP_ID switching flag indicates that the PLP_ID switching top pointer is present.

Furthermore, the PLP_ID switching head pointer is compatible with the first division mode only, and can be included in the divided header of the divided packet formed according to the first division mode. Note that, as described above, in the first division mode, when including the PLP_ID switching flag in the divided header, the PLP_ID switching flag cannot be used in a case where PLP_ID changes twice in the 188-byte divided packet.

Note that, in the cases of the second and third division modes, the zero padding is performed, and the head of the ALP packet always matches the head of the payload of the divided packet and the switching of PLP_ID matches the head of the payload of the divided packet. Therefore, the PLP_ID switching head pointer is not necessary.

The packet ID is an ID for identifying a divided packet. As this packet ID, a fixed ID or PLP_ID of an ALP packet can be assigned.

In the case where the fixed ID is assigned as the packet ID, 13 bits are secured for the bit length, and a value of PID not used in MPEG2-TS is fixedly assigned. Furthermore, since the packet ID (fixed ID) is compatible with all of the first, second, and third division modes, the packet ID (fixed ID) can be included in the divided header of the divided packet formed according to these division modes.

Furthermore, in the case where PLP_ID is assigned as the packet ID, 6 bits are secured as the bit length, and PLP_ID of the ALP packet in the payload is assigned. Furthermore, since the packet ID (PLP_ID) is compatible with all of the first, second, and third division modes, the packet ID (PLP_ID) can be included in the divided header of the divided packet formed according to these division modes.

Note that, in the first division mode, in the case where PLP_ID is assigned as the packet ID, the packet ID (PLP_ID) can be used in a case where PLP_ID changes once in the 188-byte divided packet, but the packet ID (PLP_ID) cannot be used in a case where PLP_ID changes twice. In other words, here, if two types of PLP_IDs are necessary, PLP_IDs before and after switching of PLP_ID are used, for example. However, three or more types of PLP_IDs cannot be coped.

Furthermore, in the case where PLP_ID is assigned as the packet ID in the second and third division modes, transmission of PLP_ID with the ALP packet is unnecessary.

(Example of Header Information of Divided Header)

Next, specific examples of the correspondence between the header information of the divided header and the division mode of the divided packet will be described with reference to FIGS. 18 and 19.

Figure 18:
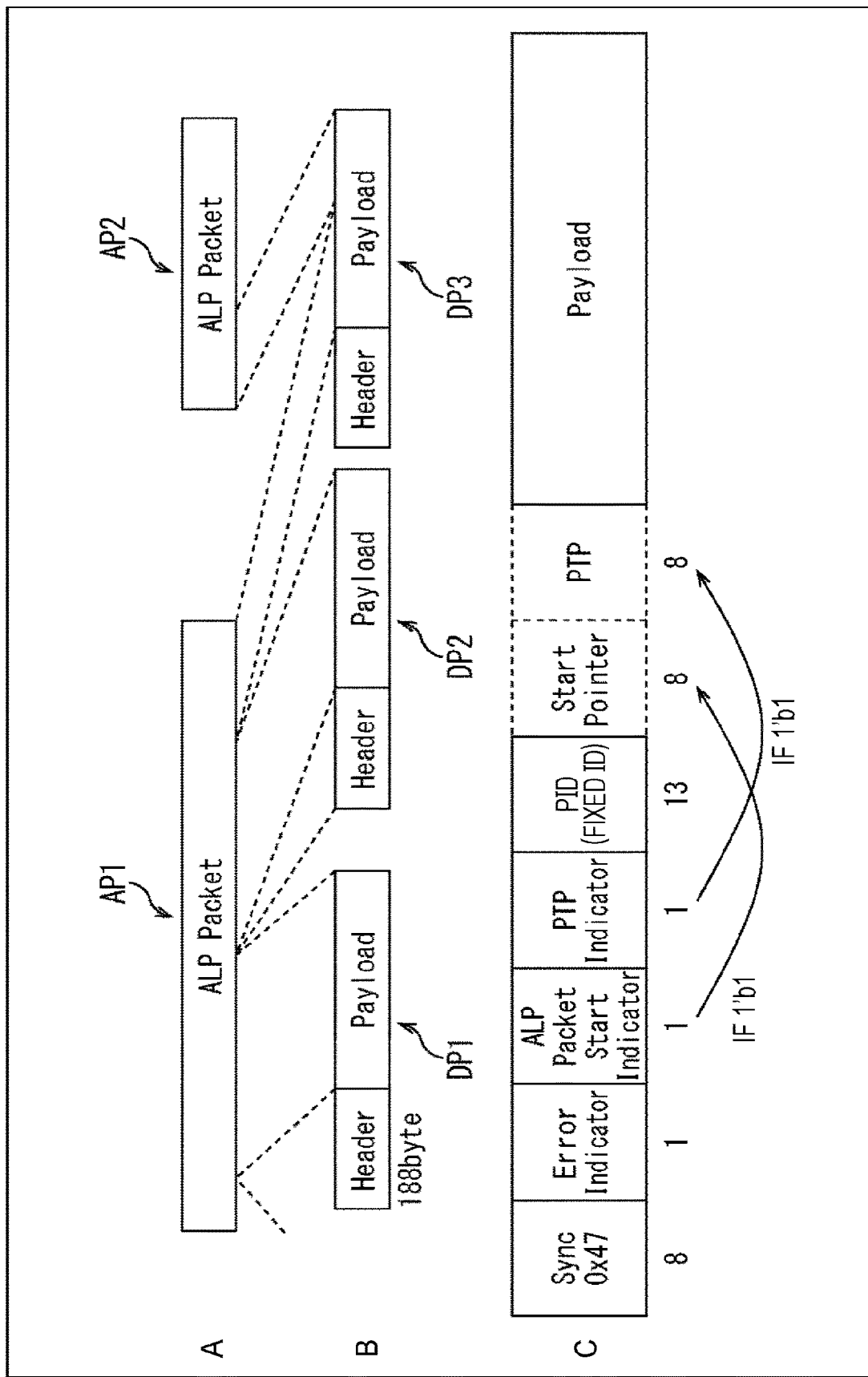
FIG. 18 is a diagram illustrating an example of a structure of a divided packet according to a seventh embodiment.

FIG. 18 illustrates a first example of the header information of the divided header.

In the first example, since the first division mode is adopted as the division mode of the divided packet, a part of a head ALP packet AP1 is cut out and a divided header is added, so that a divided packet DP1 and a divided packet DP2 are generated in order (A and B in FIG. 18). Furthermore, a part of the ALP packet AP1 and a part of an ALP packet AP2 are cut out and a divided header is added, so that a divided packet DP3 is generated (A and B in FIG. 18).

Here, the divided header of the divided packet can have the structure illustrated in C in FIG. 18. In other words, in C in FIG. 18, 8-bit sync byte, 1-bit error indicator, 1-bit ALP packet head presence/absence flag, 1-bit PTP presence/absence flag, and 13-bit packet ID (fixed ID) are arranged in the divided header.

In the divided header, in a case where '1'b1' is set as the ALP packet head presence/absence flag, an 8-bit head pointer is arranged. For example, since the head of the ALP packet AP2 is included in the payload of the divided packet DP3, of the divided packets DP1 to DP3 illustrated in B in FIG. 18, '1'b1' is set as the ALP packet head presence/absence flag, and the head pointer indicating the position of the head of the ALP packet AP2 is arranged in the divided header.

Furthermore, in the divided header, in a case where '1'b1' is set as the PTP presence/absence flag, 8-bit PTP is arranged. Thereby, for example, PTP as the time information can be arranged in the divided header of any of the divided packets DP1 to DP3 illustrated in B in FIG. 18. Note that, in the case where PTP is arranged in the divided header, zero padding is performed for the remaining region to cause the divided packet to have the fixed length (188 bytes). Furthermore, in the case where PTP is arranged in the divided header, transmission of PTP with the ALP packet is unnecessary.

Figure 19:
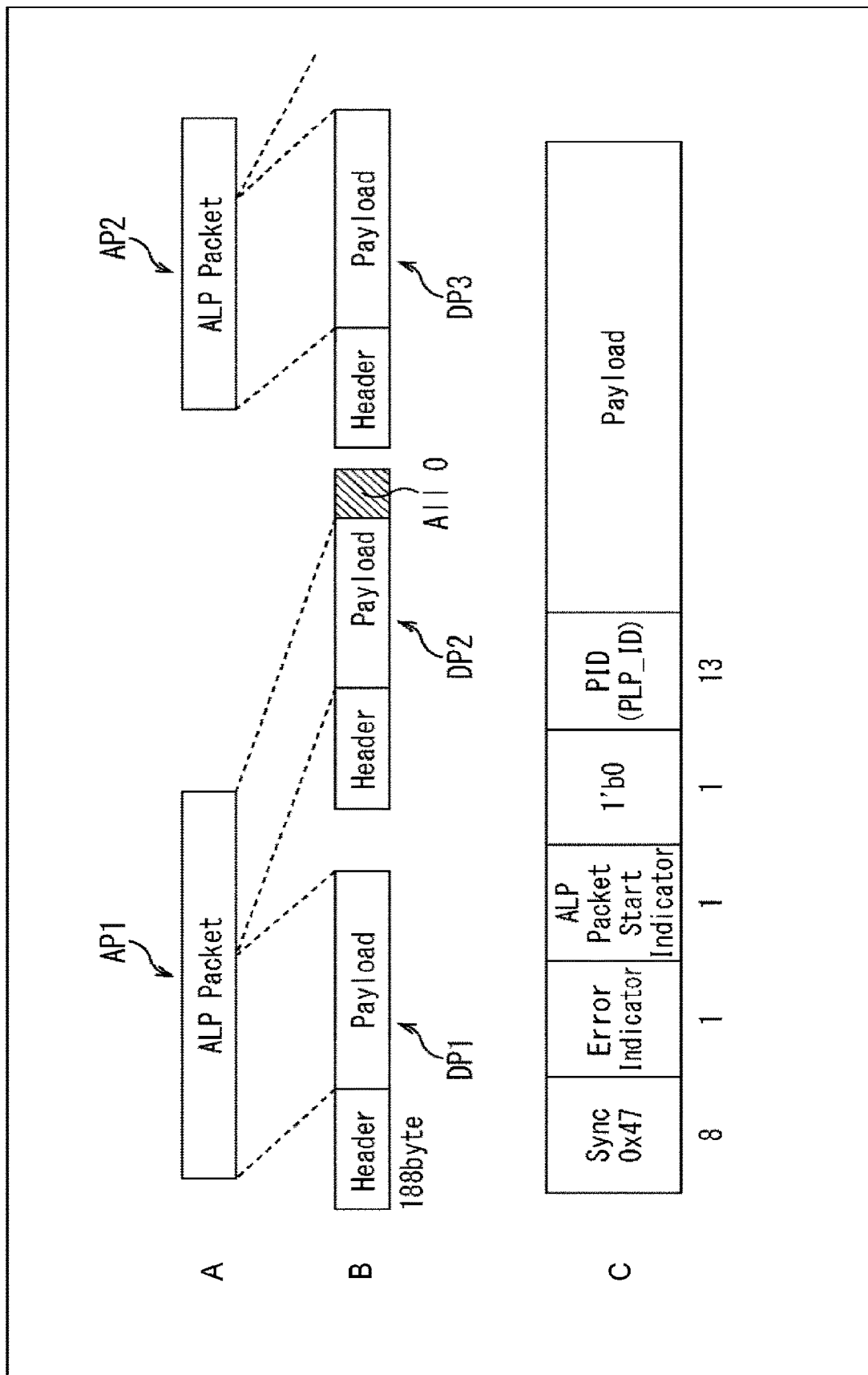
FIG. 19 is a diagram illustrating an example of a structure of a divided packet according to the seventh embodiment.

FIG. 19 illustrates a second example of the header information of the divided header.

In the second example, since the second division mode is adopted as the division mode of the divided packet, a part of the head ALP packet AP1 is cut out and a divided header is added, so that a divided packet DP1 and a divided packet DP2 are generated in order, and in the divided packet DP2, zero padding is performed for the remaining region according to the fixed length (A and B in FIG. 19). Furthermore, a part of the ALP packet AP2 is cut out and a divided header is added, so that the divided packet DP3 is generated (A and B in FIG. 19).

Here, the divided header of the divided packet can have the structure illustrated in C in FIG. 19. In other words, in C in FIG. 19, 8-bit sync byte, 1-bit error indicator, 1-bit ALP packet head presence/absence flag, 1-bit '1'b0', and 13-bit packet ID (PLP_ID) are arranged in the divided header. Note that PLP_ID is expressed using arbitrary 6 bits of the 13-bit packet ID. At this time, the 13-bit packet ID includes the 6-bit PLP_ID and 7-bit reserved.

In the divided header, the ALP packet head presence/absence flag is arranged, but in the second division mode, the head of the ALP packet always matches the head of the divided packet and thus the head pointer does not need to be arranged.

For example, since the head of the payload is the head of the ALP packet in the divided packets DP1 and DP3, of the divided packets DP1 to DP3 illustrated in B in FIG. 19, '1'b1' is set as the ALP packet head presence/absence flag, but not head pointer is arranged in the divided header. Note that '1'b0' is set as the ALP packet head presence/absence flag in the divided header of the divided packet DP2.

Furthermore, in the divided header illustrated in C in FIG. 19, since PLP_ID of the ALP packet in the payload is arranged as the packet ID, transmission of PLP_ID as the ALP packet is unnecessary in the case where PLP_ID is transmitted as the ALP packet.

Note that the header information illustrated in FIGS. 18 and 19 is examples, and as the header information, information of one or more of the synchronization byte, error indicator, PTP presence/absence flag, ALP packet head presence/absence flag, PLP_ID switching flag, PTP, head pointer, PLP_ID switching head pointer, and packet ID illustrated in FIG. 17 can be included, for example.

Furthermore, the header information of the divided header illustrated in FIG. 17 is also an example, and various types of information such as effective information for restoring the ALP packet from the divided packet can be included, for example.

The seventh embodiment has been described above.

(8) Eighth Embodiment

Next, a structure of a divided packet of an eighth embodiment will be described with reference to FIGS. 20 and 21.

In the eighth embodiment, arrangement of PLP_ID in a head of an ALP packet is determined in advance to enable transmission of PLP_ID without using the divided header, instead of transmitting PLP_ID using the format of the ALP packet, as illustrated in the third embodiment.

Figure 20:
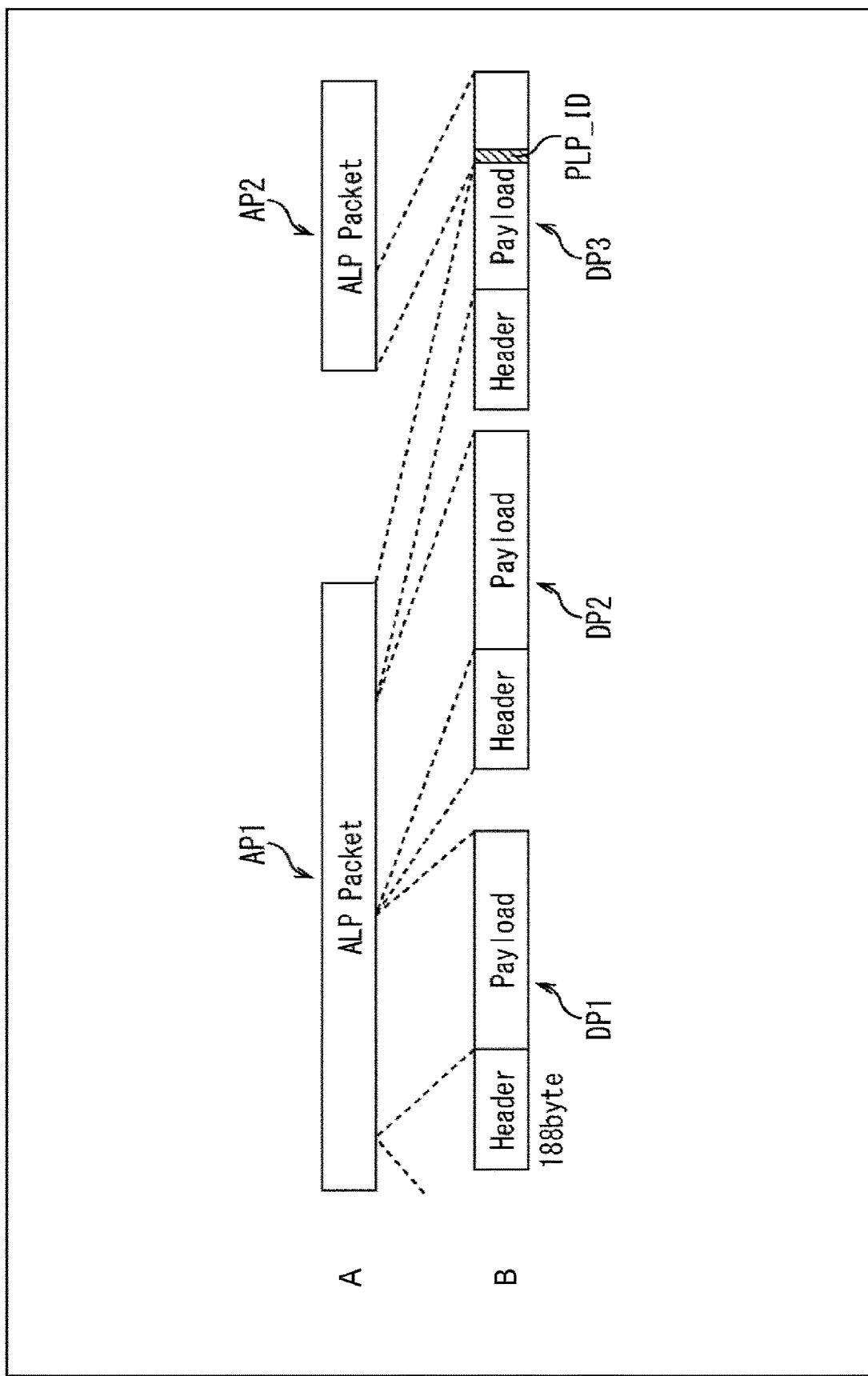
FIG. 20 is a diagram illustrating an example of a structure of a divided packet according to an eighth embodiment.

FIG. 20 illustrates a packet processed by a demodulation circuit 201.

In FIG. 20, a part of a head ALP packet AP1 is cut out and a divided header is added, so that a divided packet DP1 and a divided packet DP2 are generated in order (A and B in FIG. 20). Furthermore, a part of the ALP packet AP1 and a part of an ALP packet AP2 are cut out and a divided header is added, so that a divided packet DP3 is generated (A and B in FIG. 20).

Here, since arrangement of PLP_ID in a predetermined byte (for example, 1 byte) of the head of the ALP packet is determined in advance, PLP_ID is arranged in the head of the ALP packet. Therefore, focusing on a payload of the divided packet DP3, PLP_ID is arranged in the head of the ALP packet AP2 arranged following the ALP packet AP1. In other words, PLP_ID is associated in units of ALP packets, and PLP_ID is added to a boundary of the ALP packet.

Figure 21:
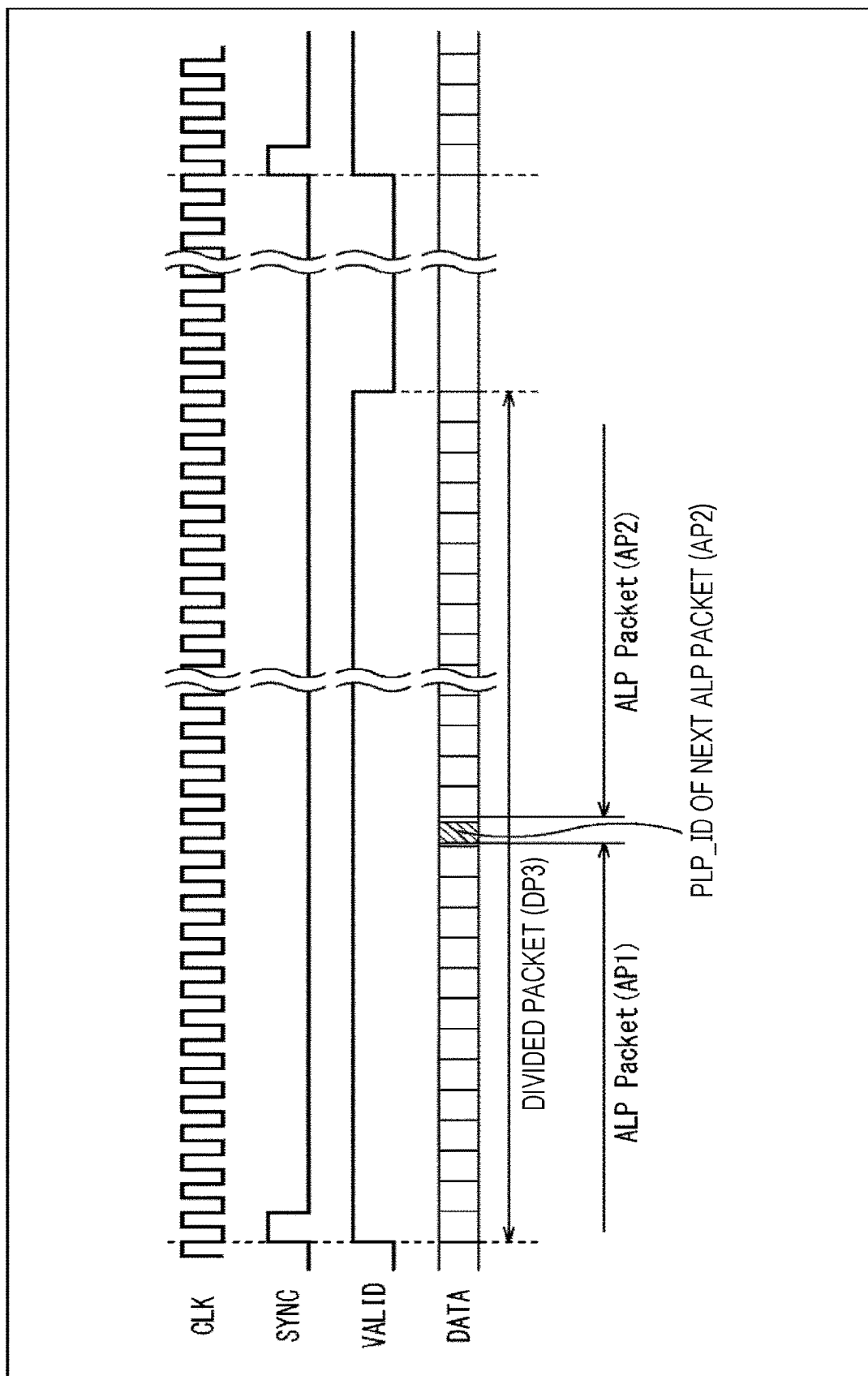
FIG. 21 is a timing chart for describing transmission of a divided packet according to the eighth embodiment.

FIG. 21 is a timing chart for describing transmission of a divided packet according to the eighth embodiment.

FIG. 21 illustrates a timing chart of a clock signal (CLK), a synchronization signal (SYNC), a valid signal (VALID), and data (DATA) of a divided packet transmitted between the demodulation circuit 201 and a processing circuit 202 via a physical interface 203 in a reception device 20.

Here, focusing on the timing chart of the data (DATA), the boundary of the ALP packet AP1 and the ALP packet AP2 is present in the payload of the 188-byte divided packet DP3, and PLP_ID (for example, '2'd0') of the next ALP packet is arranged in 1 bit of the head of the ALP packet AP2.

By determining insertion of PLP_ID in the first byte of the head of the ALP packet in advance in this way, the processing circuit 202 can acquire PLP_ID, recognizing that the first byte of the head of the ALP packet is an identifier (PLP_ID), and can process a stream for each PLP, without inserting PLP_ID in the divided header.

The eighth embodiment has been described above.

(9) Ninth Embodiment

Finally, a structure of a divided packet of a ninth embodiment will be described with reference to FIGS. 22 and 23.

In the ninth embodiment, an adaptation field (adaptation_field) is arranged in the divided packet, and information such as PTP or PLP_ID as time information is caused to be included in the adaptation field.

Figure 22:
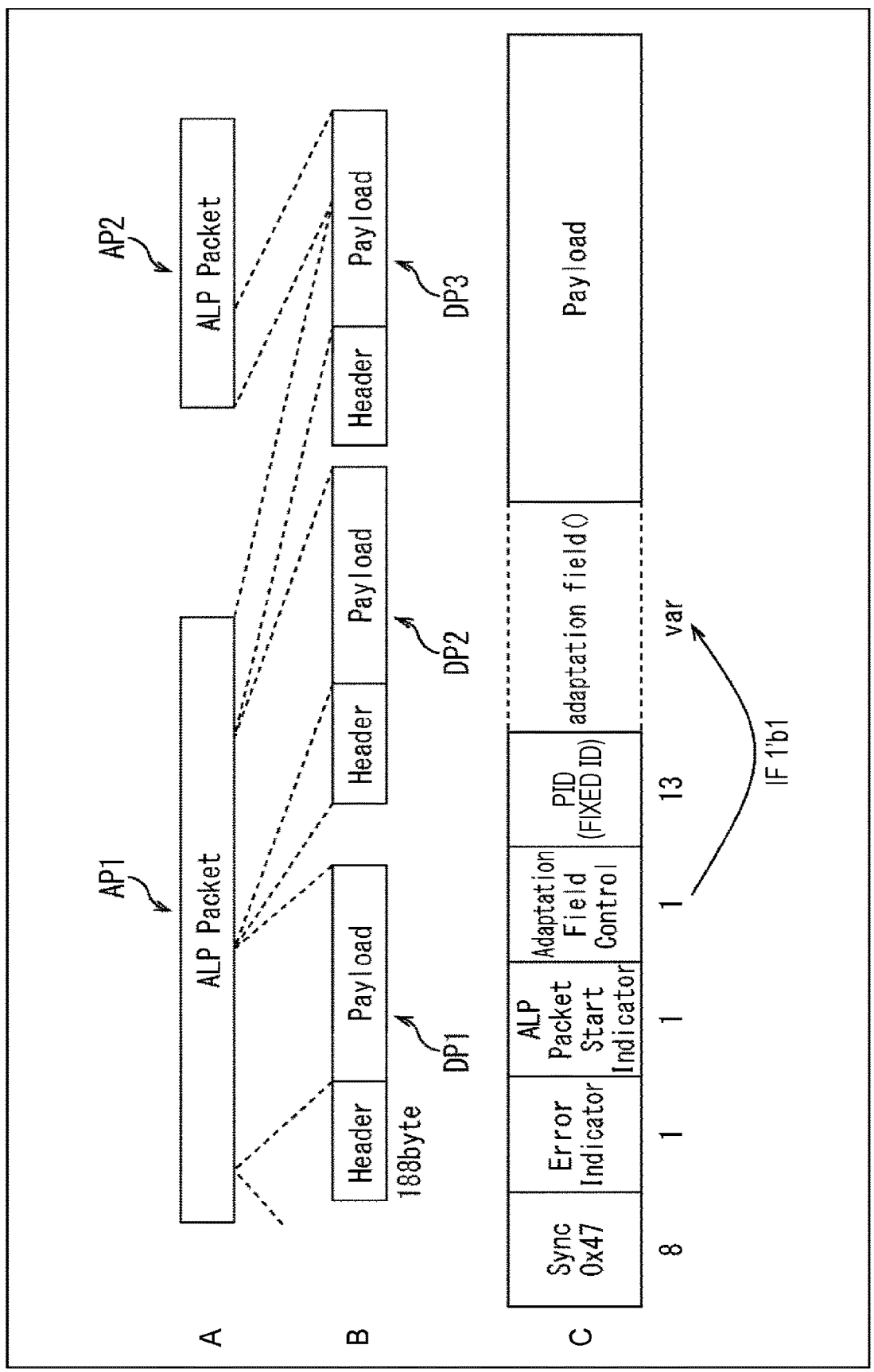
FIG. 22 is a diagram illustrating an example of a structure of a divided packet according to a ninth embodiment.

FIG. 22 illustrates a packet processed by a demodulation circuit 201.

Here, a part of a divided packet AP1 is cut out and a divided header is added, so that a divided packet DP1 and a divided packet DP2 are generated in order (A and B in FIG. 22). Furthermore, a part of the divided packet AP1 and a part of a divided packet AP2 are cut out and a divided header is added, so that a divided packet DP3 is generated (A and B in FIG. 22).

Here, the divided header of the divided packet can have the structure illustrated in C in FIG. 22. In other words, in C in FIG. 22, 8-bit sync byte, 1-bit error indicator, 1-bit ALP packet head presence/absence flag, 1-bit adaptation field control, and 13-bit packet ID (fixed ID) are arranged in the divided header.

The adaptation field control is a region used for indicating a configuration of the adaptation field. For example, 1 bit is allocated to the adaptation field control, and '1'b1' is set in a case where there is an adaptation field, and '1'b0' is set in a case where there is no adaptation field.

Note that the adaptation field is defined as a var-type field, details of the adaptation field will be described below with reference to FIG. 23. Furthermore, FIG. 22 illustrates a case where a division mode of the divided packet is a first division mode. However, the structure of the divided packet in the ninth embodiment is also applicable to divided packets adopting second or third division mode.

(Example of Syntax)

FIG. 23 is a diagram illustrating an example of syntax of the adaptation field (Adaptation_field) illustrated in FIG. 22.

8-bit adaptation field length represents the length of the adaptation field.

In a case where the value of adaptation_field_length is larger than 0, the discontinuity_indicator, random_access_indicator, ALP_packet_priority_indicator, PTP_flag, and PLP_ID_flag are arranged.

1-bit discontinuity_indicator indicates that the ALP packet is discontinuous. 1-bit random_access_indicator indicates a random access point.

1-bit ALP_packet_priority_indicator indicates that a target ALP packet has higher priority than other ALP packets.

1-bit PTP_flag indicates that the adaptation field includes PTP. 1-bit PLP_ID_flag indicates that the adaptation field includes PLP_ID. Note that 3 bits following PLP_ID_flag are reserved, which means future reservation.

In a case of PTP_flag=1, L1B_time_info_flag, L1D_time_sec, L1D_time_msec, L1D_time_usec, and L1D_time_nsec are arranged as time information (PTP).

2-bit L1B_time_info_flag represents the accuracy of PTP (time information). For example, '01' means milliseconds, '10' means microseconds, and '11' means nanoseconds.

32-bit L1D_time_sec represents time information in seconds. 10-bit L1D_time_msec represents time information in milliseconds. 10-bit L1D_time_usec represents time information in microseconds. 10-bit L1D_time_nsec represents time information in nanoseconds.

For example, in a case where L1B_time_info_flag='01', the time information in seconds (L1D_time_sec) and the time information in milliseconds (L1D_time_msec) are arranged. Furthermore, for example, in a case where L1B_time_info_flag='10', the time information in microseconds (L1D_time_usec) is arranged in addition to the time information in seconds and milliseconds (L1D_time_sec and L1D_time_msec). Furthermore, for example, in a case where L1B_time_info_flag='11', time information in nanoseconds (L1D_time_nsec) is arranged in addition to the time information in seconds, milliseconds, and microseconds (L1D_time_sec, L1D_time_msec, and L1D_time_usec).

In a case of PTP_ID_flag='1', PLP_ID is arranged.

6-bit PLP_ID is an ID for identifying a physical layer pipe (PLP). Note that 2 bits following PLP_ID are reserved.

Note that the adaptation field is also used in the MPEG2-TS method, and by using this adaptation field, PLP_ID and the time information (PTP) can be transmitted with a structure similar to the structure by the MPEG2-TS method, instead of being transmitted using the ALP packet, as described in the third and fourth embodiments.

Furthermore, FIG. 23 illustrates the case in which the time information (PTP) and PLP_ID are arranged in the adaptation field. However, only one of the pieces of information may be arranged, and moreover, information other than the time information (PTP) and PLP_ID may be arranged.

The ninth embodiment has been described above.

4. FLOW OF PROCESSING EXECUTED ON RECEPTION SIDE

A flow of processing executed by the demodulation circuit 201 and the processing circuit 202 in the reception device 20 will be described with reference to the flowchart in FIG. 24.

Figure 24:
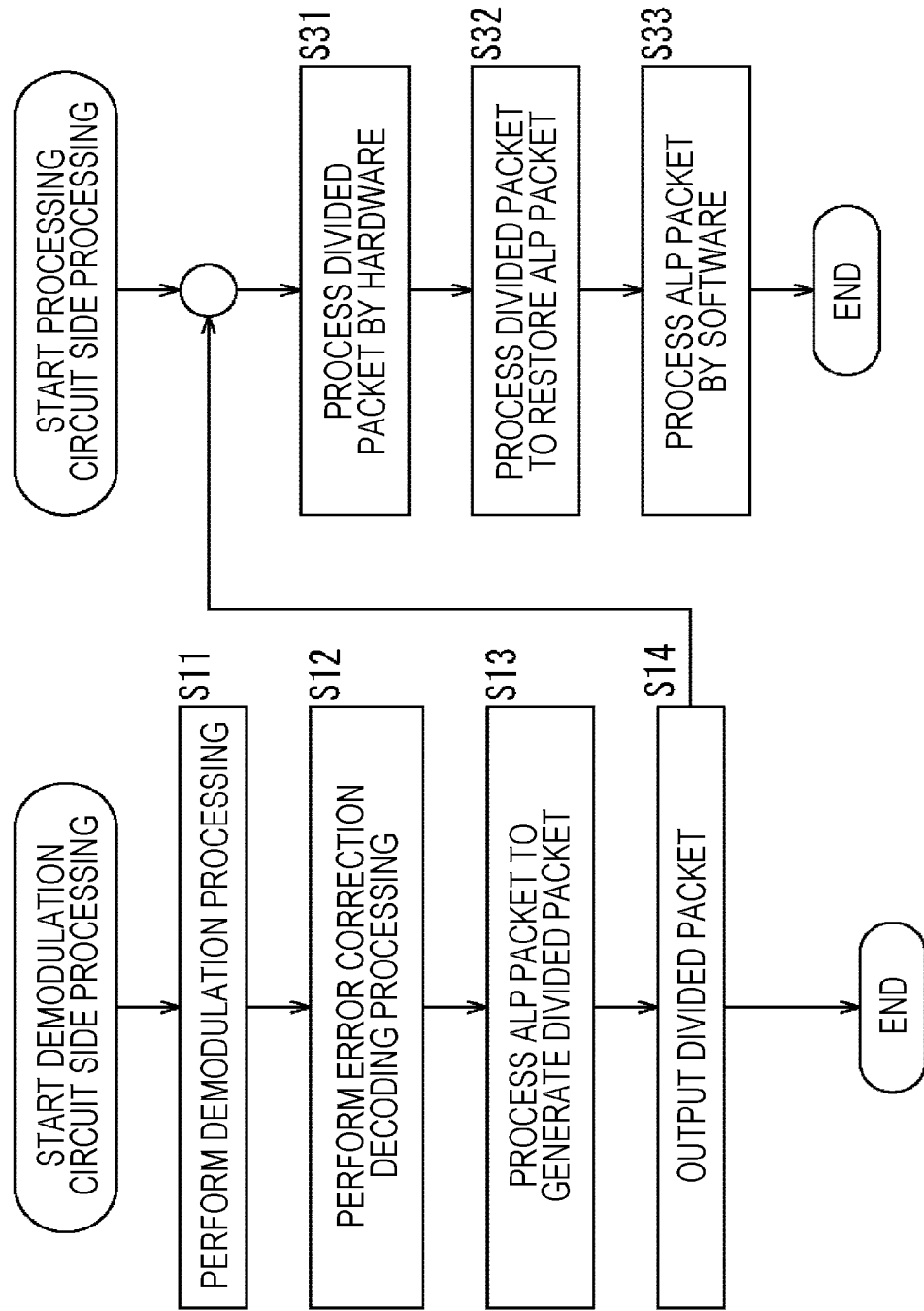
FIG. 24 is a flowchart for describing a flow of processing of a demodulation circuit and a processing circuit on the reception side.

Note that, in FIG. 24, processing in steps S11 to S14 is executed by the demodulation circuit 201, and processing in steps S31 to S33 is executed by the processing circuit 202.

In step S11, the demodulation unit 211 performs the demodulation processing for the broadcast signal received via the antenna.

In step S12, the error correction unit 212 performs the error correction decoding processing for the data obtained in the processing in step S11.

In step S13, the I/F unit 213 processes the ALP packet on the basis of the data obtained in the processing in step S12 to generate the divided packet.

This divided packet has the packet length (188 bytes) according to the TS packet, and for example, the divided header includes the head pointer as the restoration information. Furthermore, for example, PTP as the time information and PLP_ID can be added to a specific ALP packet as the private user data (PUD). In other words, the divided packet generated here is the divided packet corresponding to any of the first to ninth embodiments described above.

In step S14, the I/F unit 213 outputs the divided packets obtained in the processing of step S13 to the processing circuit 202 via the physical interface 203.

In the processing circuit 202, the divided packet from (the I/F unit 213 of) the demodulation circuit 201 is input through the physical interface 203 and is stored in the memory 221. The divided packet recorded in the memory 221 is processed by hardware by the demux 222 (S31).

Furthermore, by processing the divided packet, the ALP packet is restored from the data arranged in the payload on the basis of the restoration information (for example, the head pointer) included in the divided header (S32). Then, the ALP packet recorded in the memory 223 is processing by software by the SW processing unit 224 (S33).

Note that, in the processing circuit 202, in a case where PTP is added to the ALP packet, clock recovery can be performed using PTP as the time information. Furthermore, in a case where PLP_ID is added to the ALP packet, the processing circuit 202 can identify to which PLP the ALP packet belongs at the time of M-PLP.

The flow of the processing performed by the demodulation circuit 201 and the processing circuit 202 has been described above.

5. MODIFICATION (Example of Configuration of Device)

In the above description, the demodulation circuit 201 as a demodulation IC and the processing circuit 202 as a system on chip (SoC) have been described as being incorporated in the reception device 20. However, the demodulation circuit 201 and the processing circuit 202 may be respectively configured as independent devices. In other words, the demodulation circuit 201 can also be said to be a demodulation unit incorporated in the reception device 20 or a demodulation device that independently performs processing alone. Furthermore, the processing circuit 202 can also be said to be a processing unit incorporated in the reception device 20 or a processing device that independently performs processing alone.

(Example of Reception Device)

In the above description, the reception device 20 has been described as a fixed receiver such as a television receiver, a set top box (STB), or the like. However, for example, the reception device 20 may be a recorder, a game machine, a network storage, or the like, or a mobile receiver such as a smartphone, a mobile phone, or a tablet computer. Furthermore, for example, the reception device 20 may be a wearable computer such as a head mounted display (HMD) or an on-vehicle device mounted on a vehicle such as an on-vehicle television.

(Example of Other Broadcast Method)

In the above description, ATSC (in particular, ATSC 3.0), which is a system adopted in the United States and the like, has been described as a standard for digital broadcasting. However, the present technology may be applied to integrated services digital broadcasting (ISDB) adopted in Japan and the like, digital video broadcasting (DVB) adopted in the countries in Europe and the like, and the like, for example. Furthermore, in the above description, the case in which the existing method is the MPEG2-transport stream (TS) and the new method is the IP transmission method has been described. However, a combination of other methods may be applied as the existing method and the new method.

Furthermore, as the standard for digital broadcasting, the present technology can be applied to standards such as satellite broadcasting using a broadcasting satellite (BS) or communication satellite (CS), wire broadcasting such as a cable TV (CATV), and the like, in addition to the terrestrial broadcasting.

(Application to Method Other than Broadcast Method)

Furthermore, the present technology can be applied to a predetermined standard (a standard other than the digital broadcasting standard) or the like, which is defined assuming use of a transmission line other than the broadcast network, in other words, a communication line (communication network) or the like such as the Internet or a telephone network, as the transmission line, for example. In such a case, the communication line such as the Internet or a telephone network is used as the transmission line 30 of the broadcast system 1 (FIG. 5), and the transmission device 10 can be a server provided on the Internet. Then, the communication server and the reception device 20 perform bidirectional communication via the transmission line 30 (communication line).

(Other Examples of Packet and Signaling)

Furthermore, the names of the above-described packet, frame, signaling (control information) and the like are merely examples, and other names may be used in some cases. However, the difference between these names is a formal difference, and the substantial content of the target packet, frame, signaling, and the like is not different.

For example, the ALP packet is an example of a transmission packet, and the transmission packet includes, for example, a type length value (TLV) packet, a generic stream encapsulation (GSE) packet, which are variable-length packets, or the like. Note that the frame and the packet may be used by the same meaning.

(Another Example of Time Information)

In the above description, the case of using time information defined in precision time protocol (PTP) as the time information has been described. However, an embodiment is not limited to the case, and arbitrary time information such as time information defined in network time protocol (NTP) or third generation partnership project (3GPP), time information included in global positioning system (GPS) information, or time information in an independently determined format can be used, for example.

Furthermore, in the above description, the time information has been described to indicate the time of the head of the physical layer frame. However, an embodiment is not limited to the case, and the time information may indicate any time. For example, the time information can indicate time (absolute time) at a predetermined position in the stream of the physical layer frame. That is, the time at the predetermined position in this stream is time of predetermined timing while the bit of the predetermined position is being processed by the transmission device 10. Furthermore, in a case where a structure provided with a preamble the physical layer frame is adopted, the time information may be included in the preamble.

6. CONFIGURATION OF COMPUTER

Figure 25:
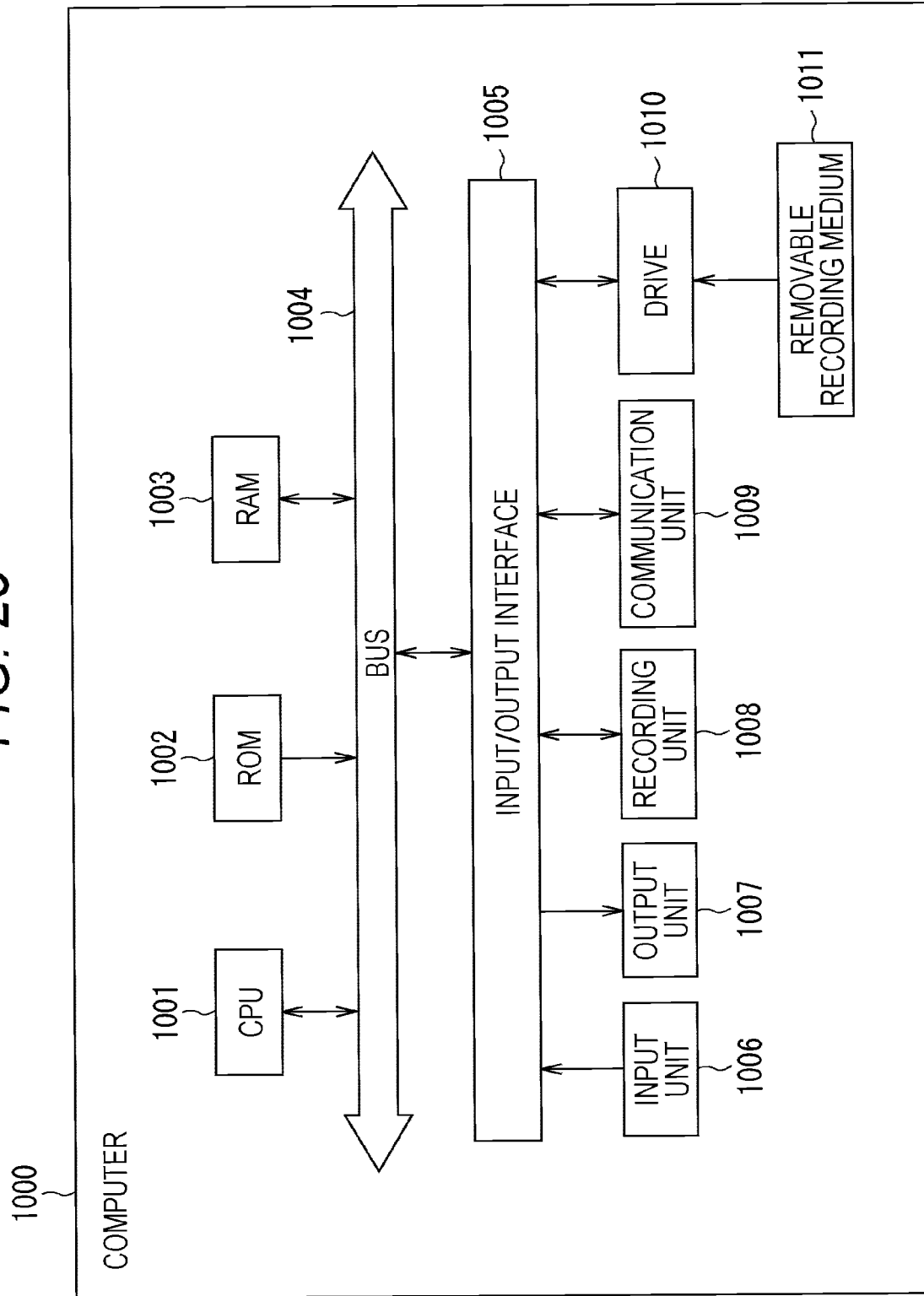
FIG. 25 is a diagram illustrating a configuration example of a computer.

The series of processing described above can be executed by hardware or software. In the case of executing the series of processing by software, a program that configures the software is installed in a computer. FIG. 25 is a diagram illustrating a configuration example of hardware of the computer that executes the above-described series of processing by a program.

In a computer 1000, a central processing unit (CPU) 1001, a read only memory (ROM) 1002, and a random access memory (RAM) 1003 are mutually connected by a bus 1004. Moreover, an input/output interface 1005 is connected to the bus 1004. An input unit 1006, an output unit 1007, a recording unit 1008, a communication unit 1009, and a drive 1010 are connected to the input/output interface 1005.

The input unit 1006 includes a keyboard, a mouse, a microphone, and the like. The output unit 1007 includes a display, a speaker, and the like. The recording unit 1008 includes a hard disk, a nonvolatile memory, and the like. The communication unit 1009 includes a network interface and the like. The drive 1010 drives a removable recording medium 1011 such as a magnetic disk, an optical disk, a magneto-optical disk, or a semiconductor memory.

In the computer 1000 configured as described above, the CPU 1001 loads the program recorded in the ROM 1002 or the recording unit 1008 to the RAM 1003 via the input/output interface 1005 and the bus 1004 and executes the program, so that the above-described series of processing is performed.

The program to be executed by the computer 1000 (CPU 1001) can be recorded on the removable recording medium 1011 as a package medium, for example, and can be provided. Furthermore, the program can be provided via a wired or wireless transmission medium such as a local area network, the Internet, or digital satellite broadcasting.

In the computer 1000, the program can be installed to the recording unit 1008 via the input/output interface 1005 by attaching the removable recording medium 1011 to the drive 1010. Furthermore, the program can be received by the communication unit 1009 via a wired or wireless transmission medium and installed in the recording unit 1008. Other than the above method, the program can be installed in the ROM 1002 or the recording unit 1008 in advance.

Here, in the present specification, the processing performed by the computer in accordance with the program does not necessarily have to be performed in chronological order in accordance with the order described as the flowchart. In other words, the processing performed by the computer according to the program also includes processing executed in parallel or individually (for example, parallel processing or processing by an object). Furthermore, the program may be processed by one computer (processor) or distributed in and processed by a plurality of computers.

Note that embodiments of the present technology are not limited to the above-described embodiments, and various modifications can be made without departing from the gist of the present technology. For example, it goes without saying that each of the above-described first to ninth embodiments is established alone as an embodiment, and a plurality of the embodiments may be combined.

Furthermore, the present technology can have the following configurations.

(1)

A demodulation device including:
a demodulation unit configured to demodulate a first transmission packet obtained from a broadcast signal; and
an output unit configured to output a divided packet via a predetermined interface, the divided packet being obtained by dividing the first transmission packet that is a variable-length packet used in a first transmission method into a packet length according to a second transmission packet that is a fixed-length packet used in a second transmission method and arranging the first transmission packet in a payload, and adding a header including information for restoring the first transmission packet to the payload.

(2)

The demodulation device according to (1), in which the output unit sequentially divides the first transmission packet and sequentially arranges the first transmission packet in the payload of the divided packet.

(3)

The demodulation device according to (1), in which the output unit sequentially divides the first transmission packet and sequentially arranges the first transmission packet in the payload of the divided packet such that a head of the first transmission packet matches a head of the payload of the divided packet.

(4)

The demodulation device according to (3), in which, when a boundary of the first transmission packet arranged in the payload of the divided packet arrives, the output unit inserts zero padding or an arbitrary fixed sequence to a remaining region or a middle region according to the fixed length of the divided packet.

(5)

The demodulation device according to (3) or (4), in which the output unit adds the header of the divided packet only to the payload of the divided packet, the payload including the head of the first transmission packet, of the divided packets.

(6)

The demodulation device according to any one of (1) to (5), in which
the header of the divided packet includes information of one or more of
a synchronization byte for detecting the head of the divided packet,
an error indicator indicating presence or absence of an error of the first transmission packet arranged in the payload of the divided packet,
time information indicating a specific position of a physical layer frame including the first transmission packet,
a first pointer indicating a position of the head of the first transmission packet arranged in the payload of the divided packet,
a second pointer indicating the position of the head of the first transmission packet of when PLP_ID for identifying physical layer pipe (PLP) is switched, and
a packet ID for identifying the divided packet.

(7)

The demodulation device according to (6), in which a position of a first head, of the positions of the heads of the first transmission packets arranged in the payload of the divided packet, is specified with the position of the head indicated by the pointer, and a position of a second or subsequent head is specified with the position of the head indicated by the pointer and the packet length of the first transmission packet.

(8)

The demodulation device according to (6) or (7), in which a fixed ID or the PLP_ID of the first transmission packet arranged in the payload of the divided packet is assigned to the packet ID.

(9)
The demodulation device according to any one of (6) to (8), in which
the time information, the first pointer, and the second pointer are arranged according to a flag indicating presence or absence of these pieces of information.
(10)
The demodulation device according to any one of (1) to (9), in which
the divided packet includes an adaptation field, and
the adaptation field includes at least one of time information indicating a specific position of a physical layer frame including the first transmission packet or PLP_ID for identifying PLP.
(11)
The demodulation device according to any one of (1) to (10), in which
the first transmission packet is transmitted by a plurality of PLPs, and
a specific first transmission packet, of the first transmission packets obtained for the respective PLPs, includes PLP_ID for identifying PLP to which the first transmission packet belongs.
(12)
The demodulation device according to any one of (1) to (11), in which
a specific first transmission packet, of the first transmission packets, includes time information indicating a specific position of a physical layer frame including the first transmission packet.
(13)
The demodulation device according to (12), in which,
in the divided packet, in a case where the first transmission packet including the time information is arranged in the payload of the divided packet, zero padding or an arbitrary fixed sequence is inserted.
(14)
The demodulation device according to any one of (1) to (5), in which
PLP_ID for identifying PLP is added to a head of the first transmission packet arranged in the payload of the divided packet.
(15)
The demodulation device according to any one of (1) to (14), in which
the first transmission method is an internet protocol (IP) transmission method,
the first transmission packet is an ATSC link-layer protocol (ALP) packet defined by Advanced Television Systems Committee (ATSC) 3.0,
the second transmission method is an MPEG2-transport stream (TS) method, and
the second transmission packet is a TS packet.
(16)
The demodulation device according to (15), in which
the packet length of the second transmission packet is 188 bytes,
the first transmission packet is divided to obtain the divided packet in units of 188 bytes, and
the header of the divided packet includes information corresponding to a TS header of the TS packet.
(17)
A data processing method by a demodulation device, the data processing method including steps of:
by the demodulation device,
demodulating a first transmission packet obtained from a broadcast signal; and
outputting a divided packet via a predetermined interface, the divided packet being obtained by dividing the first transmission packet that is a variable-length packet used in a first transmission method into a packet length according to a second transmission packet that is a fixed-length packet used in a second transmission method and arranging the first transmission packet in a payload, and adding a header including information for restoring the first transmission packet to the payload.
(18)
A processing device including:
a processing unit configured to process a first transmission packet restored from data arranged in a payload on the basis of information included in a header of a divided packet input via a predetermined interface, in which
the first transmission packet is a variable-length packet used in a first transmission method and is obtained from a broadcast signal, and
the divided packet is obtained by dividing the first transmission packet into a packet length according to a second transmission packet that is a fixed-length packet used in a second transmission method and arranging the first transmission packet in a payload, and adding a header including information for restoring the first transmission packet to the payload.
(19)
The processing device according to (18), in which
the header of the divided packet includes information of one or more of
a synchronization byte for detecting the head of the divided packet,
an error indicator indicating presence or absence of an error of the first transmission packet arranged in the payload of the divided packet,
time information indicating a specific position of a physical layer frame including the first transmission packet,
a first pointer indicating a position of the head of the first transmission packet arranged in the payload of the payload,
a second pointer indicating the position of the head of the first transmission packet of when PLP_ID for identifying PLP is switched, and
a packet ID for identifying the divided packet.
(20)
The processing device according to (19), in which
a position of a first head, of the positions of the heads of the first transmission packets arranged in the payload of the divided packet, is specified with the position of the head indicated by the pointer, and a position of a second or subsequent head is specified with the position of the head indicated by the pointer and the packet length of the first transmission packet.
(21)
The processing device according to (19) or (20), in which
a fixed ID or the PLP_ID of the first transmission packet arranged in the payload of the divided packet is assigned to the packet ID.
(22)
The processing device according to any one of (19) to (21), in which
the time information, the first pointer, and the second pointer are arranged according to a flag indicating presence or absence of these pieces of information.

(23)
The processing device according to any one of (18) to (22), in which
the divided packet includes an adaptation field, and
the adaptation field includes at least one of time information indicating a specific position of a physical layer frame including the first transmission packet or PLP_ID for identifying PLP.

(24)
The processing device according to any one of (18) to (23), in which
the first transmission packet is transmitted by a plurality of PLPs, and
a specific first transmission packet, of the first transmission packets obtained for the respective PLPs, includes PLP_ID for identifying PLP to which the first transmission packet belongs.

(25)
The processing device according to any one of (18) to (24), in which
a specific first transmission packet, of the first transmission packets, includes time information indicating a specific position of a physical layer frame including the first transmission packet.

(26)
The processing device according to (25), in which,
in the divided packet, in a case where the first transmission packet including the time information is arranged in the payload of the divided packet, zero padding or an arbitrary fixed sequence is inserted.

(27)
The processing device according to (18), in which
PLP_ID for identifying PLP is added to a head of the first transmission packet arranged in the payload of the divided packet.

(28)
The processing device according to any one of (18) to (27), in which
the first transmission method is an IP transmission method,
the first transmission packet is an ALP packet defined by ATSC 3.0,
the second transmission method is an MPEG2-TS method, and
the second transmission packet is a TS packet.

(29)
The processing device according to (28), in which
the packet length of the second transmission packet is 188 bytes,
the first transmission packet is divided to obtain the divided packet in units of 188 bytes, and
the header of the divided packet includes information corresponding to a TS header of the TS packet.

(30)
A data processing method by a processing device, the data processing method including a step of:
by the processing device,
processing a first transmission packet restored from data arranged in a payload on the basis of information included in a header of a divided packet input via a predetermined interface, in which
the first transmission packet is a variable-length packet used in a first transmission method and is obtained from a broadcast signal, and
the divided packet is obtained by dividing the first transmission packet into a packet length according to a second transmission packet that is a fixed-length packet used in a second transmission method and arranging the first transmission packet in a payload, and adding a header including information for restoring the first transmission packet to the payload.

(31)
A reception device including:
a demodulation unit configured to demodulate a first transmission packet obtained from a broadcast signal; and
a processing unit configured to process the first transmission packet demodulated by the demodulation unit, in which
the demodulation unit and the processing unit are connected via a predetermined interface,
the demodulation unit outputs a divided packet to the processing unit, the divided packet being obtained by dividing the first transmission packet that is a variable-length packet used in a first transmission method into a packet length according to a second transmission packet that is a fixed-length packet used in a second transmission method and arranging the first transmission packet in a payload, and adding a header including information for restoring the first transmission packet to the payload, and
the processing unit processes the first transmission packet restored from data arranged in the payload on the basis of information included in the header of the divided packet input from the demodulation unit.

(32)
The reception device according to (31), in which
the demodulation unit sequentially divides the first transmission packet and sequentially arranges the first transmission packet in the payload of the divided packet.

(33)
The reception device according to (31), in which,
when the demodulation unit sequentially divides the first transmission packet and sequentially arranges the first transmission packet in the payload of the divided packet, the demodulation unit causes a head of the first transmission packet to match a head of the payload of the divided packet.

(34)
The reception device according to (33), in which,
when a boundary of the first transmission packet arranged in the payload of the divided packet arrives, zero padding or an arbitrary fixed sequence is inserted to a remaining region or a middle region according to the fixed length of the divided packet.

(35)
The reception device according to (33) or (34), in which
the header of the divided packet is added only to the payload of the divided packet, the payload including the head of the first transmission packet, of the divided packets.

(36)
The reception device according to any one of (31) to (35), in which
the header of the divided packet includes information of one or more of
a synchronization byte for detecting the head of the divided packet,
an error indicator indicating presence or absence of an error of the first transmission packet arranged in the payload of the divided packet,
time information indicating a specific position of a physical layer frame, a first pointer indicating a position of the head of the first transmission packet arranged in the payload of the divided packet, a second pointer indicating the position of the head of the first transmission packet of when PLP_ID for identifying PLP is switched, and a packet ID for identifying the divided packet.

(37)

The reception device according to (36), in which a position of a first head, of the positions of the heads of the first transmission packets arranged in the payload of the divided packet, is specified with the position of the head indicated by the pointer, and a position of a second or subsequent head is specified with the position of the head indicated by the pointer and the packet length of the first transmission packet.

(38)

The reception device according to (36) or (37), in which a fixed ID or the PLP_ID of the first transmission packet arranged in the payload of the divided packet is assigned to the packet ID.

(39)

The reception device according to any one of (36) to (38), in which the time information, the first pointer, and the second pointer are arranged according to a flag indicating presence or absence of these pieces of information.

(40)

The reception device according to any one of (31) to (39), in which the divided packet includes an adaptation field, and the adaptation field includes at least one of time information indicating a specific position of a physical layer frame including the first transmission packet or PLP_ID for identifying PLP.

(41)

The reception device according to any one of (31) to (40), in which the first transmission packet is transmitted by a plurality of PLPs, and a specific first transmission packet, of the first transmission packets obtained for the respective PLPs, includes PLP_ID for identifying PLP to which the first transmission packet belongs.

(42)

The reception device according to any one of (31) to (41), in which a specific first transmission packet, of the first transmission packets, includes time information indicating a specific position of a physical layer frame including the first transmission packet.

(43)

The reception device according to (42), in which, in the divided packet, in a case where the first transmission packet including the time information is arranged in the payload of the divided packet, zero padding or an arbitrary fixed sequence is inserted.

(44)

The reception device according to any one of (31) to (35), in which

PLP_ID for identifying PLP is added to a head of the first transmission packet arranged in the payload of the divided packet.

(45)

The reception device according to any one of (31) to (44), in which the first transmission method is an IP transmission method, the first transmission packet is an ALP packet defined by ATSC 3.0, the second transmission method is an MPEG2-TS method, and the second transmission packet is a TS packet.

(46)

The reception device according to (45), in which the packet length of the second transmission packet is 188 bytes, the first transmission packet is divided to obtain the divided packet in units of 188 bytes, and the header of the divided packet includes information corresponding to a TS header of the TS packet.

(47)

The reception device according to any one of (31) to (46), in which the demodulation unit is a demodulation device, and the processing unit is a system on chip (SoC).

(48)

A data processing method by a reception device including a demodulation unit configured to demodulate a first transmission packet obtained from a broadcast signal, and a processing unit configured to process the first transmission packet demodulated by the demodulation unit, the demodulation unit and the processing unit being connected via a predetermined interface, the data processing method including steps of:

by the demodulation unit, outputting a divided packet to the processing unit, the divided packet being obtained by dividing the first transmission packet that is a variable-length packet used in a first transmission method into a packet length according to a second transmission packet that is a fixed-length packet used in a second transmission method and arranging the first transmission packet in a payload, and adding a header including information for restoring the first transmission packet to the payload; and by the processing unit, processing the first transmission packet restored from data arranged in the payload on the basis of information included in the header of the divided packet input from the demodulation unit.

REFERENCE SIGNS LIST

1 Broadcast system
10 Transmission device
20 Reception device
30 Transmission line
201 Demodulation circuit
202 Processing circuit
203 Physical interface
211 Demodulation unit
212 Error correction unit
213 I/F unit
221 Memory
222 Demux
223 Memory
224 SW processing unit
1000 Computer
1001 CPU

The invention claimed is:

1. A demodulation device, comprising:
a demodulation circuitry configured to demodulate a first transmission packet obtained from a broadcast signal; and
processing circuitry configured to output a divided packet via a predetermined interface, the divided packet being obtained by dividing the first transmission packet, which is a variable-length packet used in a first transmission method, into a packet length according to a size of a second transmission packet, which is a fixed-length packet used in a second transmission method, arranging at least a portion of the first transmission packet in a payload, and adding, to the payload, a header including information for restoring the first transmission packet,
wherein a length of the header varies depending on whether or not a head of the first transmission packet is included in the payload of the divided packet.

2. The demodulation device according to claim 1, wherein the processing circuitry is further configured to sequentially divide the first transmission packet and sequentially arrange the first transmission packet in the payload of the divided packet.

3. The demodulation device according to claim 1, wherein
the processing circuitry is further configured to sequentially divide the first transmission packet and sequentially arrange the first transmission packet in the payload of the divided packet such that the head of the first transmission packet matches a head of the payload of the divided packet.

4. The demodulation device according to claim 3, wherein, when a boundary of the first transmission packet arranged in the payload of the divided packet arrives, the processing circuitry is further configured to insert zero padding or an arbitrary fixed sequence to a remaining region or a middle region according to the fixed length of the divided packet.

5. The demodulation device according to claim 3, wherein
the processing circuitry is further configured to add the header of the divided packet only to the payload of the divided packet when the payload includes the head of the first transmission packet, of the divided packets.

6. The demodulation device according to claim 1, wherein the header of the divided packet includes information of one or more of
a synchronization byte for detecting a head of the divided packet,
an error indicator indicating presence or absence of an error of the first transmission packet arranged in the payload of the divided packet,
time information indicating a specific position of a physical layer frame including the first transmission packet,
a first pointer indicating a position of the head of the first transmission packet arranged in the payload of the divided packet,
a second pointer indicating the position of the head of the first transmission packet of when a PLP_ID identifying a physical layer pipe (PLP) is switched, and
a packet ID identifying the divided packet.

7. The demodulation device according to claim 6, wherein
a position of a first head, of positions of heads of first transmission packets arranged in the payload of the divided packet, is specified with the position of the first head indicated by the first pointer, and a position of a second or subsequent head is specified with the position of the first head indicated by the first pointer and the packet length of the first transmission packet.

8. The demodulation device according to claim 6, wherein a fixed ID or the PLP_ID of the first transmission packet arranged in the payload of the divided packet is assigned to the packet ID.

9. The demodulation device according to claim 6, wherein the time information, the first pointer, and the second pointer are arranged according to a flag indicating presence or absence of the time information, the first pointer, and the second pointer.

10. The demodulation device according to claim 1, wherein
the divided packet includes an adaptation field, and
the adaptation field includes at least one of time information indicating a specific position of a physical layer frame including the first transmission packet or a PLP_ID identifying a PLP.

11. The demodulation device according to claim 1, wherein
the first transmission packet is transmitted by a plurality of PLPs, and
a specific first transmission packet, of first transmission packets obtained for the respective PLPs, includes a PLP_ID identifying a PLP to which the specific first transmission packet belongs.

12. The demodulation device according to claim 1, wherein a specific first transmission packet, of first transmission packets, includes time information indicating a specific position of a physical layer frame including the specific first transmission packet.

13. The demodulation device according to claim 12, wherein, in the divided packet, when the first transmission packet including the time information is arranged in the payload of the divided packet, zero padding or an arbitrary fixed sequence is inserted.

14. The demodulation device according to claim 1, wherein a PLP_ID identifying a PLP is added to the head of the first transmission packet arranged in the payload of the divided packet.

15. The demodulation device according to claim 1, wherein
the first transmission method is an internet protocol (IP) transmission method,
the first transmission packet is an ATSC link-layer protocol (ALP) packet defined by Advanced Television Systems Committee (ATSC) 3.0,
the second transmission method is an MPEG2-transport stream (TS) method, and
the second transmission packet is a TS packet.

16. The demodulation device according to claim 15, wherein
the packet length of the second transmission packet is 188 bytes,
the first transmission packet is divided to obtain the divided packet in units of 188 bytes, and
the header of the divided packet includes information corresponding to a TS header of the TS packet.

17. A data processing method by a demodulation device, the data processing method comprising:
demodulating, by the demodulation device, a first transmission packet obtained from a broadcast signal; and
outputting a divided packet via a predetermined interface, the divided packet being obtained by dividing the first transmission packet, which is a variable-length packet used in a first transmission method, into a packet length according to a size of a second transmission packet, which is a fixed-length packet used in a second transmission method, arranging at least a portion of the first transmission packet in a payload, and adding, to the payload, a header including information for restoring the first transmission packet, wherein a length of the header varies depending on whether or not a head of the first transmission packet is included in the payload of the divided packet.

18. A processing device, comprising:

processing circuitry configured to process a first transmission packet restored from data arranged in a payload based on information included in a header of a divided packet input via a predetermined interface, wherein the first transmission packet is a variable-length packet used in a first transmission method and is obtained from a broadcast signal, and the divided packet is obtained by dividing the first transmission packet into a packet length according to a size of a second transmission packet, which is a fixed-length packet used in a second transmission method, arranging at least a portion of the first transmission packet in the payload, and adding, to the payload, the header, including information for restoring the first transmission packet, wherein a length of the header varies depending on whether or not a head of the first transmission packet is included in the payload of the divided packet.

19. The processing device according to claim 18, wherein the header of the divided packet includes information of one or more of a synchronization byte for detecting a head of the divided packet, an error indicator indicating presence or absence of an error of the first transmission packet arranged in the payload of the divided packet, time information indicating a specific position of a physical layer frame including the first transmission packet, a first pointer indicating a position of the head of the first transmission packet arranged in the payload of the payload, a second pointer indicating the position of the head of the first transmission packet of when a PLP_ID identifying a PLP is switched, and a packet ID identifying the divided packet.

20. The processing device according to claim 19, wherein a position of a first head, of positions of heads of first transmission packets arranged in the payload of the divided packet, is specified with the position of the first head indicated by the first pointer, and a position of a second or subsequent head is specified with the position of the first head indicated by the first pointer and the packet length of the first transmission packet.

21. The processing device according to claim 19, wherein a fixed ID or the PLP_ID of the first transmission packet arranged in the payload of the divided packet is assigned to the packet ID.

22. The processing device according to claim 19, wherein the time information, the first pointer, and the second pointer are arranged according to a flag indicating presence or absence of the time information, the first pointer, and the second pointer.

23. The processing device according to claim 18, wherein the divided packet includes an adaptation field, and the adaptation field includes at least one of time information indicating a specific position of a physical layer frame including the first transmission packet or a PLP_ID identifying a PLP.

24. The processing device according to claim 18, wherein the first transmission packet is transmitted by a plurality of PLPs, and a specific first transmission packet, of first transmission packets obtained for the respective PLPs, includes a PLP_ID identifying a PLP to which the specific first transmission packet belongs.

25. The processing device according to claim 18, wherein a specific first transmission packet, of first transmission packets, includes time information indicating a specific position of a physical layer frame including the specific first transmission packet.

26. The processing device according to claim 25, wherein, in the divided packet, when the first transmission packet including the time information is arranged in the payload of the divided packet, zero padding or an arbitrary fixed sequence is inserted.

27. The processing device according to claim 18, wherein a PLP_ID identifying a PLP is added to the head of the first transmission packet arranged in the payload of the divided packet.

28. The processing device according to claim 18, wherein the first transmission method is an IP transmission method, the first transmission packet is an ALP packet defined by ATSC 3.0, the second transmission method is an MPEG2-TS method, and the second transmission packet is a TS packet.

29. The processing device according to claim 28, wherein the packet length of the second transmission packet is 188 bytes, the first transmission packet is divided to obtain the divided packet in units of 188 bytes, and the header of the divided packet includes information corresponding to a TS header of the TS packet.

30. A data processing method by a processing circuitry, the data processing method comprising:

processing, by the processing circuitry, a first transmission packet restored from data arranged in a payload based on information included in a header of a divided packet input via a predetermined interface, wherein the first transmission packet is a variable-length packet used in a first transmission method and is obtained from a broadcast signal, and the divided packet is obtained by dividing the first transmission packet into a packet length according to a size of a second transmission packet, which is a fixed-length packet used in a second transmission method, arranging at least a portion of the first transmission packet in the payload, and adding, to the payload, the header including information for restoring the first transmission packet, wherein a length of the header varies depending on whether or not a head of the first transmission packet is included in the payload of the divided packet.

31. A reception device, comprising:

demodulation circuitry configured to demodulate a first transmission packet obtained from a broadcast signal; and processing circuitry configured to process the first transmission packet demodulated by the demodulation circuitry, wherein the demodulation circuitry and the processing circuitry connected via a predetermined interface, the demodulation circuitry is configured to output a divided packet to the processing circuitry, the divided packet being obtained by dividing the first transmission packet, which is a variable-length packet used in a first transmission method, into a packet length according to a size of a second transmission packet, which is a fixed-length packet used in a second transmission method, arranging at least a portion of the first transmission packet in a payload, and adding, to the payload, a header including information for restoring the first transmission packet, wherein a length of the header varies depending on whether or not a head of the first transmission packet is included in the payload of the divided packet, and the processing circuitry is configured to process, the first transmission packet restored from data arranged in the payload based on information included in the header of the divided packet input from the demodulation circuitry.

32. The reception device according to claim 31, wherein the demodulation circuitry is configured to sequentially divide the first transmission packet and sequentially arrange the first transmission packet in the payload of the divided packet.

33. The reception device according to claim 31, wherein, when the demodulation circuitry sequentially divides the first transmission packet and sequentially arranges the first transmission packet in the payload of the divided packet, the demodulation circuitry is further configured to cause the head of the first transmission packet to match a head of the payload of the divided packet.

34. The reception device according to claim 33, wherein, when a boundary of the first transmission packet arranged in the payload of the divided packet arrives, zero padding or an arbitrary fixed sequence is inserted to a remaining region or a middle region according to the fixed length of the divided packet.

35. The reception device according to claim 33, wherein the header of the divided packet is added only to the payload of the divided packet when the payload includes, the head of the first transmission packet, of the divided packets.

36. The reception device according to claim 31, wherein the header of the divided packet includes information of one or more of a synchronization byte for detecting a head of the divided packet, an error indicator indicating presence or absence of an error of the first transmission packet arranged in the payload of the divided packet, time information indicating a specific position of a physical layer frame, a first pointer indicating a position of the head of the first transmission packet arranged in the payload of the divided packet, a second pointer indicating the position of the head of the first transmission packet of when a PLP_ID identifying a PLP is switched, and a packet ID identifying the divided packet.

37. The reception device according to claim 36, wherein a position of a first head, of positions of heads of first transmission packets arranged in the payload of the divided packet, is specified with the position of the first head indicated by the first pointer, and a position of a second or subsequent head is specified with the position of the first head indicated by the first pointer and the packet length of the first transmission packet.

38. The reception device according to claim 36, wherein a fixed ID or the PLP_ID of the first transmission packet arranged in the payload of the divided packet is assigned to the packet ID.

39. The reception device according to claim 36, wherein the time information, the first pointer, and the second pointer are arranged according to a flag indicating presence or absence of the time information, the first pointer, and the second pointer.

40. The reception device according to claim 31, wherein the divided packet includes an adaptation field, and the adaptation field includes at least one of time information indicating a specific position of a physical layer frame including the first transmission packet or a PLP_ID identifying a PLP.

41. The reception device according to claim 31, wherein the first transmission packet is transmitted by a plurality of PLPs, and a specific first transmission packet, of first transmission packets obtained for the respective PLPs, includes a PLP_ID identifying a PLP to which the specific first transmission packet belongs.

42. The reception device according to claim 31, wherein a specific first transmission packet, of first transmission packets, includes time information indicating a specific position of a physical layer frame including the specific first transmission packet.

43. The reception device according to claim 42, wherein, in the divided packet, when the first transmission packet including the time information is arranged in the payload of the divided packet, zero padding or an arbitrary fixed sequence is inserted.

44. The reception device according to claim 31, wherein a PLP_ID identifying a PLP is added to the head of the first transmission packet arranged in the payload of the divided packet.

45. The reception device according to claim 31, wherein the first transmission method is an IP transmission method, the first transmission packet is an ALP packet defined by ATSC 3.0, the second transmission method is an MPEG2-TS method, and the second transmission packet is a TS packet.

46. The reception device according to claim 45, wherein the packet length of the second transmission packet is 188 bytes, the first transmission packet is divided to obtain the divided packet in units of 188 bytes, and the header of the divided packet includes information corresponding to a TS header of the TS packet.

47. The reception device according to claim 31, wherein the demodulation circuity is a demodulation device, and the processing circuitry is a system on chip (SoC).

48. A data processing method by a reception device including demodulation circuitry configured to demodulate a first transmission packet obtained from a broadcast signal, and processing circuitry configured to process the first transmission packet demodulated by the demodulation circuitry, the demodulation circuitry and the processing circuitry being connected via a predetermined interface, the data processing method comprising:

by the demodulation circuitry, outputting a divided packet to the processing circuitry, the divided packet being obtained by dividing the first transmission packet, which is a variable-length packet used in a first transmission method into a packet length according to a size of a second transmission packet, which is a fixed-length packet used in a second transmission method, arranging at least a portion of the first transmission packet in a payload, and adding, to the payload, a header including information for restoring the first transmission packet, wherein a length of the header varies depending on whether or not a head of the first transmission packet is included in the payload of the divided packet; and by the processing circuitry, processing the first transmission packet restored from data arranged in the payload based on information included in the header of the divided packet input from the demodulation circuitry.

* * * * *